United States Patent
Shibata

(10) Patent No.: US 7,583,322 B2
(45) Date of Patent: Sep. 1, 2009

(54) TELEVISION AND ADJUSTMENT METHOD FOR THE SAME

(75) Inventor: Keigo Shibata, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 721 days.

(21) Appl. No.: 11/293,752

(22) Filed: Dec. 1, 2005

(65) Prior Publication Data

US 2006/0119737 A1    Jun. 8, 2006

(30) Foreign Application Priority Data

Dec. 6, 2004    (JP)    .............................. 2004-352398

(51) Int. Cl.
 *H04N 9/64* (2006.01)
 *H04N 5/14* (2006.01)
(52) U.S. Cl. ........................ 348/571; 348/572; 348/630; 348/531; 348/540; 348/379
(58) Field of Classification Search ................. 348/379, 348/571, 630, 516, 540, 525, 531, 715, 687, 348/692, 675, 572
See application file for complete search history.

(56) References Cited

U.S. PATENT DOCUMENTS 5,410,365 A * 4/1995 Nakamura et al. .......... 348/692

7,030,936 B2 * 4/2006 Sasada ....................... 348/691
7,365,798 B2 * 4/2008 Nashida ..................... 348/558

FOREIGN PATENT DOCUMENTS

JP    2000-013805    1/2000

* cited by examiner

*Primary Examiner*—David L Ometz
*Assistant Examiner*—Jean W. Désir
(74) *Attorney, Agent, or Firm*—Yokoi & Co., U.S.A., Inc.; Peter Ganjian

(57) ABSTRACT

A pedestal level of each of the R-Y and B-Y signals (color-difference signals) in a horizontal synchronization time T1 of a horizontal synchronizing signal is detected, and a pedestal level adjustment value for adjustment of the pedestal level of each of the R-Y and B-Y signals is determined based on the pedestal level determined in such a manner that a difference in pedestal level of each of the R-Y and B-Y signals between in the horizontal synchronization time T1 and in a horizontal scanning time T2 of the horizontal synchronizing signal is lessen.

The pedestal level adjustment value determined is stored and video amplification-chroma circuit 130 adjusts the pedestal level of each of the R-Y signal and the B-Y signal in the horizontal synchronization time T1 of the horizontal synchronizing signal by an amount of adjustment value stored in.

6 Claims, 14 Drawing Sheets

R-Y output
- - - - Original waveform

R-Y output
- - - - Original waveform

TELEVISION AND ADJUSTMENT METHOD FOR THE SAME

BACKGROUND OF THE INVENTION

1. Field of the Invention

The present invention relates to a television for displaying an image by adjusting a pedestal level (black level) of a video signal in a synchronization time of a synchronizing signal by an amount of adjustment according to an adjustment value for the pedestal level, and to an adjustment method for the same.

2. Description of the Prior Art

Televisions are conventionally provided with a video amplification-chroma circuit mainly comprising a chroma IC, a microcomputer IC, a video output circuit for generating signals of three primary colors, such as RGB signals (a red (R) signal, a green (G) signal and a blue (B) signal) or the like, a picture tube, a deflection circuit for generating a high-frequency signal and a drive current, a deflection coil, a high voltage circuit having a flyback transformer (FBT) for supplying the picture tube with high voltage, and the like. The video amplification-chroma circuit generates a sawtooth-like drive signal and a RGB color signal from a component video signal inputted thereto which consists of a luminance signal (Y) with a synchronizing signal component superimposed thereon, a red color-difference signal (V, Cr, or the like), and a blue color-difference signal (U, Cb, or the like).

The V signal and the U signal are provided with respective pedestal level adjustment values for adjustment of pedestal levels thereof which values are stored in a semiconductor memory. The video amplification-chroma circuit adjusts the pedestal level of each of the V and U signals by an amount of adjustment according to the corresponding adjustment value during a horizontal synchronization time of a horizontal synchronizing signal. This is because electric noise may get into the V and U signals from the FBT during the horizontal synchronization time, causing deviation in the pedestal levels of the V and U signals. More specifically, an operator in a television manufacturing plant makes efforts to connect a television to a computer, to perform an input operation of a pedestal level adjustment value into the computer so as to eliminate the deviation in the pedestal level during the horizontal synchronization time, and to write the pedestal level adjustment value in the chroma IC from the computer via an IIC bus of the television.

Such a technology has been hitherto known as disclosed in, for example, JP-A-2000-13805.

Particularly, making an effort to write the pedestal level adjustment value in the chroma IC as described above involves complex processing, which is time consuming.

It should be noted that the technology as disclosed in the above patent document cannot solve the above-mentioned problem because it involves allowing chromaticity of images of a plurality of input video signals to be adjusted by a common operation. This technology needs to take the trouble to demodulate and modulate the input video signal, leading to a complicated structured circuit.

SUMMARY OF THE INVENTION

The present invention has been accomplished in view of the problems encountered with the prior art, and it is an object of the invention to provide a television that can eliminate the necessity of complicated adjustment procedures of a pedestal level of a video signal.

To achieve the above-mentioned object, in a first aspect of the invention, there is provided a television which comprises a video amplification-chroma circuit, a microcomputer, a video output circuit, a picture tube, a deflection circuit, a high voltage circuit having a flyback transformer, and a deflection coil. The video amplification-chroma circuit comprises a separating circuit for separating vertical and horizontal synchronizing signals from a component video signal, and a semiconductor memory for storing therein a pedestal level adjustment value for V for adjustment of a pedestal level of a red color-difference signal, the V pedestal level adjustment value having any one of a plurality of stepwise values, and a pedestal level adjustment value for U for adjustment of a pedestal level of the blue color-difference signal, the U pedestal level adjustment value having any one of a plurality of stepwise values. The video amplification-chroma circuit further comprises a pedestal level adjustment circuit for adjusting the pedestal level of the red color-difference signal by an amount of adjustment according to the V pedestal level adjustment value stored in the semiconductor memory, and for adjusting the pedestal level of the blue color-difference signal by an amount of adjustment according to the U pedestal level adjustment value stored in the semiconductor memory in a horizontal synchronization time of the horizontal synchronizing signal separated by the separating circuit. The television is operable to display an image from the picture tube based on the component video signal adjusted. The television further comprises an amplification circuit for amplifying the respective red and blue color-difference signals with reference to a ground potential to generate respective amplified signals for V and U, and a smoothing circuit for smoothing the respective amplified signals for V and U generated. The microcomputer includes an analog/digital conversion circuit for generating an amplified signal value for V and an amplified signal value for U in digital form corresponding to and from the amplified signals for V and U smoothed by the smoothing circuit, respectively. The microcomputer is adapted to generate the amplified signal values for V and U in a state where the red and blue color-difference signals are not being inputted into the video amplification-chroma circuit, and to select and determine the pedestal level adjustment value for V from the plurality of stepwise values, based on the amplified signal value for V generated in the state, in such a manner that the amplified signal value for V generated by the analog/digital conversion circuit takes a value that is most close to zero, as well as the pedestal level adjustment value for U from the plurality of stepwise values, based on the amplified signal value for U generated in the state, in such a manner that the U amplified signal value generated by the analog/digital conversion circuit takes a value that is most close to zero. In addition, the microcomputer is adapted to output the pedestal level adjustment value for V and the pedestal level adjustment value for U both determined to the video amplification-chroma circuit. The video amplification-chroma circuit is adapted to store in the semiconductor memory the pedestal level adjustment value for V and the pedestal level adjustment value for U inputted from the microcomputer, thereby decreasing deviation in the pedestal level of each of the red and blue color-difference signals in the horizontal synchronization time which deviation may be caused by electric noise jumped into the red and blue color-difference signals from the flyback transformer during the horizontal synchronization time.

According to the first aspect of the invention, white balance of the images based on not only a composite video signal, but also a component video signal, can also be sufficiently adjusted without taking a complicated procedure for adjustment of the television. This can surely decrease difference in white balance of the image between both the video signals inputted in comparison.

In a second aspect of the invention, there is provided a television which comprises a memory for storing therein a pedestal level adjustment value for adjustment of a pedestal level of a video signal, an adjustment section for adjusting the pedestal level of the video signal in a synchronization time of a synchronizing signal in synchronization with the video signal by an amount of adjustment according to the pedestal level adjustment value stored in the memory, and a video display unit for displaying an image based on the video signal adjusted. The television further comprises a detecting section for detecting the pedestal level of the video signal in the synchronization time, an adjustment value determination section for determining the pedestal level adjustment value so as to lessen a difference between the pedestal level of the video signal in the synchronization time and a pedestal level of the video signal in a scanning time of the synchronizing signal based on the pedestal level detected, and an adjustment value storage section for storing the pedestal level adjustment value determined in the memory.

That is, when the pedestal level of the video signal in the synchronization time is detected by the detecting section, the pedestal level adjustment value is determined based on the pedestal level detected so as to lessen the difference between the pedestal level of the video signal in the synchronization time and the pedestal level thereof in the scanning time of the synchronizing signal. The pedestal level adjustment value determined is stored in the memory by the adjustment value storage section. The pedestal level of the video signal in the synchronization time is then adjusted by the amount of adjustment according to the pedestal level adjustment value stored in the memory, and the image is displayed based on the video signal obtained after the adjustment.

Thus, the pedestal level of the video signal is automatically adjusted such that the deviation in the pedestal level of the video signal is decreased which may be caused by the electric noise jumped into the video signal in the synchronization time. This can eliminates the necessity of complicated adjustment procedures of the pedestal level of the video signal.

In a third aspect of the invention, there is provided a television which comprises a video input section for inputting a video signal on which a synchronizing signal is superimposed and which includes a luminance signal and color-difference signals, a separating circuit for separating the synchronizing signal from the video signal inputted, a semiconductor memory for storing therein a pedestal level adjustment value for adjustment of a pedestal level of the color-difference signal, and an adjustment section for adjusting the pedestal level of the color-difference signal in a horizontal synchronization time of the synchronizing signal separated by the separating circuit by an amount of adjustment according to the pedestal level adjustment value stored in the semiconductor memory. The television also comprises a video display unit including a high voltage circuit for generating high voltage and a picture tube for emitting an electron beam therein using the high voltage inputted and for displaying an image. The video display unit displays the image from the picture tube based on the video signal adjusted. The television further comprises a detecting section for detecting the pedestal level of the color-difference signal in the horizontal synchronization time, an adjustment value determination section for determining the pedestal level adjustment value so as to lessen a difference between the pedestal level of the color-difference signal in the horizontal synchronization time and a pedestal level of the color-difference signal in a horizontal scanning time of the synchronizing signal based on the pedestal level detected, and an adjustment value storage section for storing the pedestal level adjustment value determined in the semiconductor memory.

Thus, the pedestal level of the color-difference signal is automatically adjusted such that the deviation in the pedestal level of the color-difference signal is decreased which may be caused by the electric noise jumped into the color-difference signal from the high voltage circuit in the synchronization time. This can eliminates the necessity of complicated adjustment procedures of the pedestal level of the color-difference signal.

The detecting section may include an amplification circuit for amplifying the color-difference signal to generate an amplified signal with reference to a ground potential, a smoothing circuit for smoothing the amplified signal generated, and an analog/digital conversion circuit for generating a digital amplified signal value corresponding to and from the amplified signal smoothed. The detecting section may be configured to generate the amplified signal value in the state where the color-difference signal is not being inputted into the video input section, and to detect the pedestal level of the color-difference signal in the horizontal synchronization time. The adjustment value determination section may determine the pedestal level adjustment value based on the amplified signal value generated by the analog/digital conversion circuit in the state where the color-difference signal is not being inputted so as to lessen a difference in pedestal level of the color-difference signal between in the horizontal synchronization time and in the horizontal scanning time.

In the state where the color-difference signal is not being inputted into the video input section, the color-difference signal in a time other than the horizontal synchronization time is at a reference pedestal level. The color-difference signal is amplified and smoothed with reference to the ground potential in this state. This can detect the pedestal level in the horizontal synchronization time which may be varied by the electric noise jumped into the color-difference signal from the high voltage circuit in the horizontal synchronization time. With such a simple structure, it is possible to eliminate the necessity of complicated adjustment procedures of the pedestal level of the color-difference signal.

The pedestal level adjustment value is a gradient value which has any one of a plurality of stepwise values, and the adjustment value determination section may select and determine the pedestal level adjustment value from the plurality of stepwise values, based on the amplified signal value generated by the analog/digital conversion circuit in the state where the color-difference signal is not being inputted, in such a manner that an amplified signal value generated by the analog/digital conversion circuit takes a value that is most close to zero. The pedestal level is adjusted so as to minimize the deviation in the pedestal level in the horizontal synchronization time, thereby surely permitting adjustment of the pedestal level of the color-difference signal.

The detecting section may include a difference calculator for determining a difference between the amplified signal value in the horizontal synchronization time and the amplified signal value in the horizontal scanning time. The detecting section may be configured to detect the pedestal level of the color-difference signal in the horizontal synchronization time by determining the difference in the amplified signal level between in the synchronization and scanning times in the state where the color-difference signal is not being inputted into the video input section. The adjustment value determination section may determine the pedestal level adjustment value based on the difference in the amplified signal value determined by the difference calculator in the state where the color-difference signal is not being inputted so as to lessen the difference in pedestal level of the color-difference signal between in the horizontal synchronization time and in the horizontal scanning time.

At this time, the adjustment value determination section may select and determine the pedestal level adjustment value from the plurality of stepwise values based on the difference in the amplified signal value generated by the analog/digital conversion circuit in the state where the color-difference signal is not being inputted in such a manner that the difference in the amplified signal value generated by the analog/digital conversion circuit is most close to zero.

In a fourth aspect of the invention, there is an adjustment method for a television which comprises a memory for storing therein a pedestal level adjustment value for adjustment of a pedestal level of a video signal, an adjustment section for adjusting the pedestal level of the video signal by an amount of adjustment according to the pedestal level adjustment value stored in the memory in a synchronization time of a synchronizing signal in synchronization with the video signal, and a video display unit for displaying an image based on the video signal adjusted. The method comprises the steps of:

detecting the pedestal level of the video signal in the synchronization time;

determining the pedestal level adjustment value based on the pedestal level detected so as to lessen a difference between the pedestal level of the video signal in the synchronization time and a pedestal level of the video signal in a scanning time of the synchronizing signal; and storing the pedestal level adjustment value determined in the memory.

It is understood that the invention can be embodied as the adjustment method for a television, which has the same effects and advantages as those of the television according to the invention.

DETAILED DESCRIPTION OF THE PREFERRED EMBODIMENTS

Reference will now be made in detail to exemplary embodiments of the invention in the following order.

Figure 1:
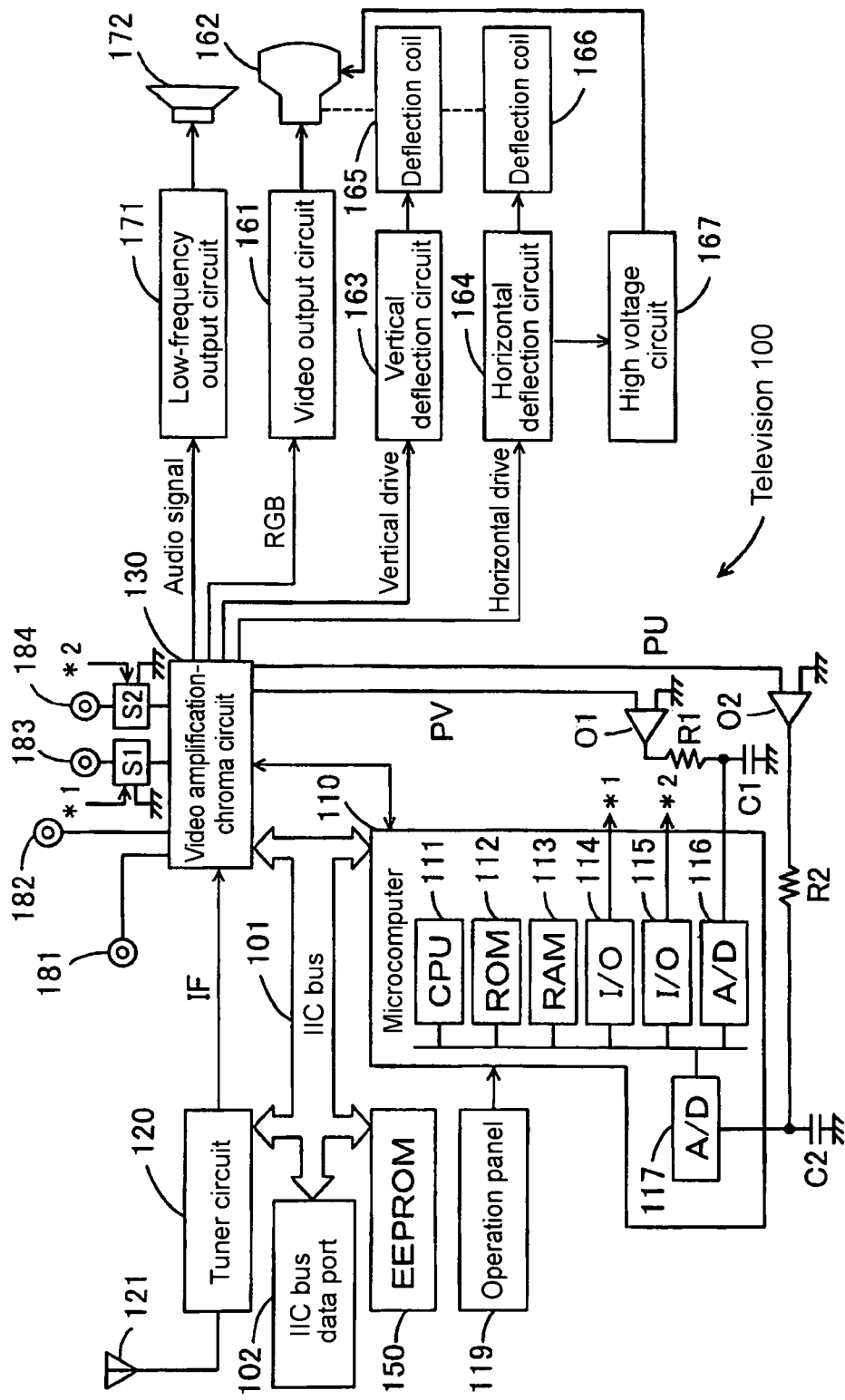
FIG. 1 is a block diagram of a configuration of a television.

(1) Configuration of Television
(2) Pedestal Level Adjustment Processing
(3) Variations
(1) Configuration of Television:

FIG. 1 shows a block diagram of a configuration of a television (TV) 100 according to one exemplary embodiment of the invention. The television 100 includes components 101, 102, 110, 119, 120, 121, 130, 150, 161 to 167, 171, 172, 181 to 184, C1, C2, O1, O2, R1, R2, as shown in the figure, and the like. An IIC bus 101 is connected to a microcomputer 110, a tuner circuit 120 mainly comprising a well-known tuner IC, a video amplification-chroma circuit 130 mainly comprising a chroma IC, an EEPROM (a rewritable nonvolatile memory which is capable of rewriting data for storage) 150, an IIC bus data port 102, and the like. These circuits send and receive serial data to and from one another via the bus 101. The tuner circuit 120 and the video amplification-chroma circuit 130 are directly connected to the microcomputer 110 via another signal wire, and are configured to operate under control based on input signals from the microcomputer 110 via the signal wire.

The microcomputer 110 is directly connected to an operation panel 119 and a remote control signal photodetector not shown, and is capable of receiving input of data corresponding to an input operation of the operation panel 119 or the like from the panel 119 or the like. The microcomputer 110 includes a CPU 111, a ROM 112, a RAM 113, a plurality of I/O ports 114 and 115, a plurality of A/D conversion circuits (analog-digital conversion circuit) 116 and 117, and a timer circuit not shown, which are connected to an inner bus. The CPU 111 controls the entire operation of the TV 100 according to programs for control of inner circuits which are written in the ROM 112 and EEPROM 150, thereby achieving the TV function.

The video amplification-chroma circuit 130 is operable to receive input from any one of an intermediate-frequency signal (IF) from the tuner circuit 120, a composite video signal from a composite video input terminal 181 (which is a video signal consisting of a combination of a luminance signal and color-difference signals, and is called VIDEO signal), and component video signals (which are collectively called YUV signal) from three component video input terminals 182 to 184. It is noted that although the terminals 181 to 184 are regarded as a video input section for inputting video signals, the video amplification-chroma circuit having a function of inputting video signals may also be regarded as the video input section. The component video signal consists of a Y signal (luminance signal) with a synchronizing signal (or, horizontal and vertical synchronizing signals) superimposed thereon, an R-Y signal (red color-difference signal), and a B-Y signal (blue color-difference signal). On the other hand, the composite video signal consists of a combination of a synchronizing signal, and Y, R-Y, and B-Y signals. Both video signals represent luminosity and color using a plurality of types of signals. Note that the TV may display an image using a component video signal inputted or the like, which consists of a luminance signal (Y), a blue color-difference signal (Cb), and a red color-difference signal (Cr).

The video amplification-chroma circuit 130 outputs to a video output circuit 161 the RGB signals (three primary color signals): red (R), green (G), and blue (B) signals. The circuit 130 also outputs a vertical drive signal (one type of drive signal) to a vertical deflection circuit 163, and a horizontal drive signal (another type of drive signal) to a horizontal deflection circuit 164. The circuit 130 further outputs audio signals to a low-frequency output circuit 171 mainly comprising a well-known audio amplifier IC. The video output circuit 161 is connected to a picture tube (CRT) 162 with deflection coils 165 and 166 attached thereto, and amplifies the RGB signals to output them to the picture tube. The picture tube 162 emits an electron beam therein using high voltage inputted from a high voltage circuit 167, receives the amplified primary color signals inputted therein, and displays the image corresponding to the video signal. The vertical deflection circuit 163 is connected to the vertical deflection coil 165, and generates a vertical drive current (one type of drive current) from the vertical drive signal inputted therein. The horizontal deflection circuit 164 is connected to the horizontal deflection coil 166 and the high voltage circuit 167 mainly comprising a well-known flyback transformer (FBT), and generates a high-frequency signal and a horizontal drive current (another type of drive current) from the horizontal drive signal inputted therein. The high voltage circuit 167 is connected to the picture tube 162, and generates the high voltage from the high frequency signal inputted from the horizontal deflection circuit to supply the picture tube with the high voltage generated. The vertical deflection coil 165 receives the input of the vertical drive current from the vertical deflection circuit, and drives the electron beam emitted within the picture tube in a vertical direction. The horizontal deflection coil 166 receives the input of the horizontal drive current from the horizontal deflection circuit, and drives the electron beam emitted within the picture tube in a horizontal direction. The low-frequency output circuit 171 is connected to a speaker 172.

The tuner circuit 120 is a well-known one, which allows for input of TV (television) signals in a predetermined broadcast system from an antenna 121, and is capable of generating and outputting the intermediate-frequency signal therefrom. The predetermined broadcast systems may include a PAL system, a SECAM system, a NTSC system, and the like. The tuner circuit may be a circuit which allows for input of the TV signals in a plurality of types of broadcast systems, and generates the intermediate-frequency signals. The circuit 120 incorporates the so-called frequency synthesizer type tuner, which includes a high-frequency amplification circuit, a local oscillation circuit, a mixing circuit, and the like, which are not shown in the figure. The circuit may include a voltage synthesizer type tuner.

Figure 2:
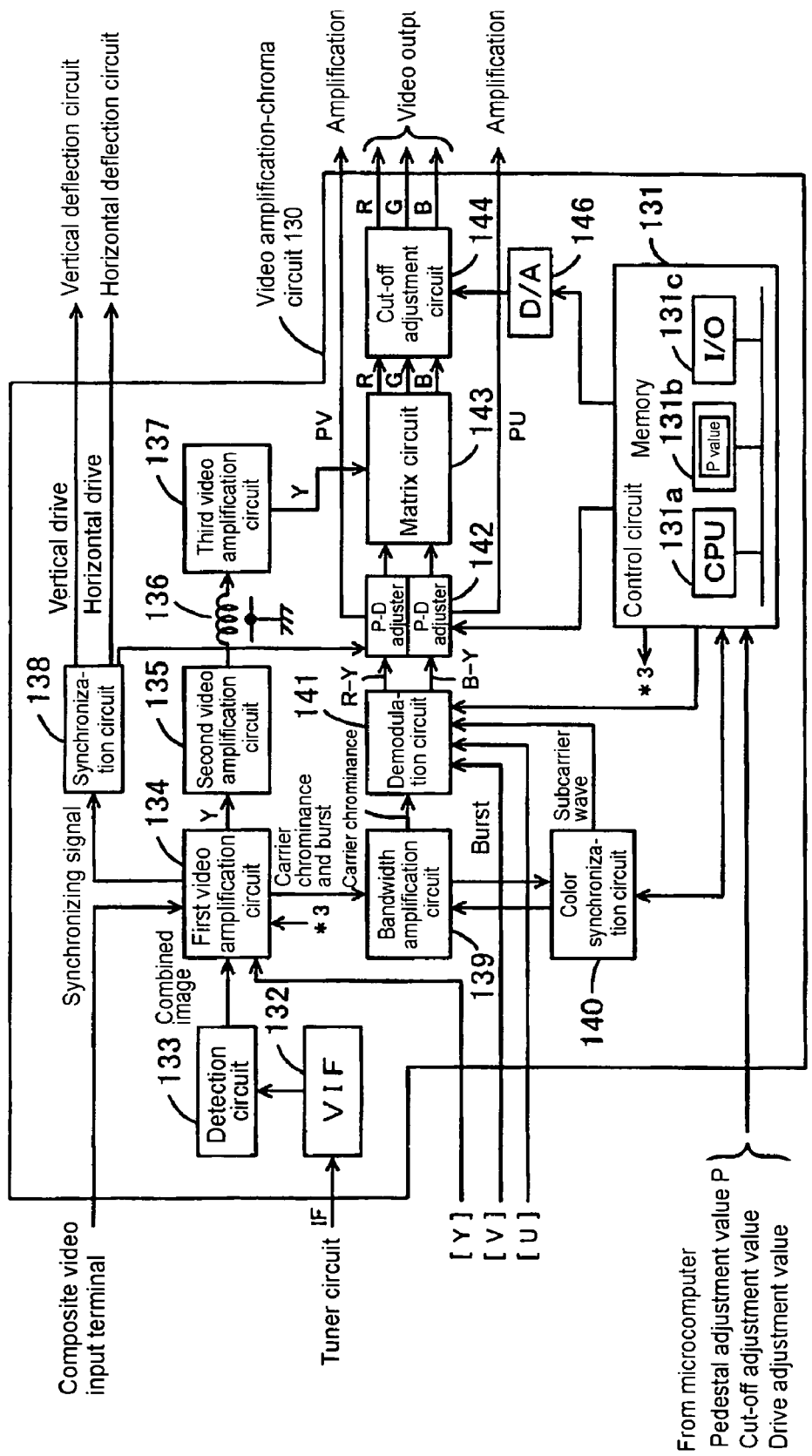
FIG. 2 is a block diagram of a configuration of a video amplification-chroma circuit.

The video amplification-chroma circuit 130 includes components 131 to 146 as shown in FIG. 2 and the like. Each of the components 134 to 137 as described herein corresponds to a video amplification circuit, while each of the components 139 to 146 corresponds to a chroma circuit. The part of the circuit 130 other than an external resistive circuit and a capacitor is one chip IC which is called a chroma IC.

A control circuit 131 is a microcomputer including a CPU 131a, a semiconductor memory 131b, a plurality of I/O ports 131c, and a plurality of latch circuits, which are connected to the inner bus. The memory 131b may be anyone or combination of the following data rewritable nonvolatile memories: a ROM, a RAM, and an EEPROM. Even when the power supply is turned off, storage data may be backed up onto the RAM using a battery or the like. The CPU 131a controls the entire circuit 130 according to a program for control of inner circuits written in the memory 131b. It should be noted that a pedestal level adjustment value (P value), a cut-off adjustment value, and a drive adjustment value can be inputted from the external microcomputer 110 via the bus 101, and saved in the memory 131b.

An intermediate-frequency amplification circuit (VIF) 132 is a well-known circuit which amplifies the intermediate-frequency signal inputted from the tuner circuit 120, and outputs it to a detection circuit 133. The detection circuit 133 is a well-known circuit which detects an image from the intermediate-frequency signal amplified, while receiving input of an oscillation signal from a VCO (Voltage Controlled Oscillator) circuit not shown, generates a combined video signal, and then outputs it to a first video amplification circuit 134. As for an audio signal, an audio component and an oscillation component of the intermediate-frequency signal amplified are mixed together into a second audio intermediate-frequency signal of, for example, 4.5 MHz. The second audio intermediate-frequency signal is inputted to a FM detection circuit not shown and FM-detected to produce an audio signal, which is outputted to the external low-frequency output circuit 171.

The first video amplification circuit (separating circuit) 134 splits or separates the combined video signal inputted into a luminance signal (Y), a carrier chrominance and burst signal, and a synchronizing signal, which are outputted to a second video amplification circuit 135, a bandwidth amplification circuit 139, and a synchronization circuit 138, respectively. Note that the carrier chrominance and burst signal is a combined signal of a carrier chrominance signal and a burst signal, which may be called a color-burst signal. The luminance signal [Y] constituting a part of the component video signal and having the synchronizing signal superimposed thereon may be inputted to the circuit 134, and the circuit 134 may separate the luminance signal [Y] into the luminance signal (Y) and the synchronizing signal (vertical and horizontal synchronizing signals) to output these signals to the circuits 135 and 138, respectively. In addition, the composite video signal may be inputted to the circuit 134, and the circuit 134 may separate the composite video signal into the luminance signal, the carrier chrominance and burst signal, and the synchronizing signal to output these signals to the circuits 135, 139, and 138, respectively.

The luminance signal separated is amplified via the second video amplification circuit 135, a delay circuit 136, and a third video amplification circuit 137 to be inputted to a matrix circuit 143.

The synchronization circuit 138 is a well-known circuit which generates a sawtooth-like vertical drive signal and a sawtooth-like horizontal drive signal from the synchronizing signal inputted, and outputs these signals to the external vertical deflection circuit 163 and the external horizontal deflection circuit 164, respectively.

The bandwidth amplification circuit 139 is a well-known circuit which separates the carrier chrominance and burst signal inputted, into a carrier chrominance signal and a burst signal, and outputs these signals to a demodulation circuit 141 and a color synchronization circuit 140, respectively. The color synchronization circuit 140 is a well-known circuit which decodes the input burst signal into a subcarrier wave and outputs the wave to the demodulation circuit 141. The demodulation circuit 141 takes two types of color-difference signals R-Y and B-Y from the input carrier chrominance signal with reference to the subcarrier wave inputted, and outputs the color-difference signals to a pedestal drive adjustment circuit 142. Alternatively, the demodulation circuit 141 may receive the input of two types of color-difference signals [V] and [U] constituting a part of the component video signal may be inputted to the demodulation circuit 141, which may output the color-difference signals R-Y and B-Y to the pedestal drive adjustment circuit 142.

Figure 3:
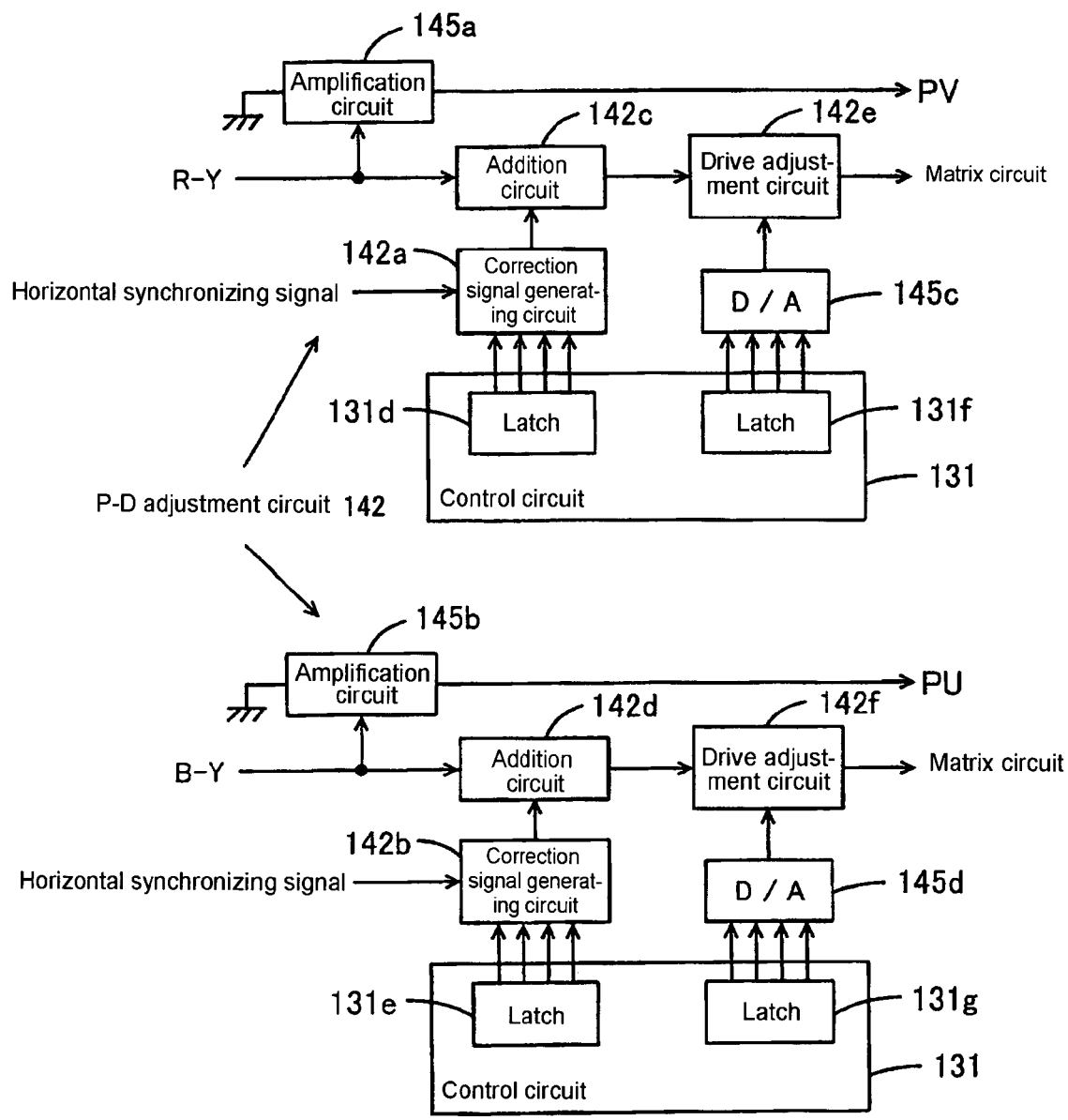
FIG. 3 is a circuit diagram showing a pedestal drive adjustment circuit together with an amplification circuit and a latch circuit of a control circuit.

As shown in FIG. 3, the pedestal drive adjustment circuit 142 includes components 142a to 142d constituting a pedestal level adjustment circuit (adjustment section), drive adjustment circuits 142e and 142f, amplification circuits 145a and 145b, and D/A conversion circuits 145c and 145d. The amplification circuits 145a and 145b may be, for example, a well-known difference amplification circuit (difference amplifier) employing, for example, an operational amplifier. The amplification circuit 145a has its input connected to the R-Y signal and a ground. The amplification circuit 145b has its input connected to the B-Y signal and the ground. The circuit 145a has its output connected to an input of the amplification circuit O1. The circuit 145b has its output connected to an input of the amplification circuit O2. The circuits 145a and 145b amplify the R-Y and B-Y signals, respectively, with reference to the ground potential to generate a PV signal and a PU signal, which are outputted to the amplification circuits O1 and O2, respectively.

Figure 4:
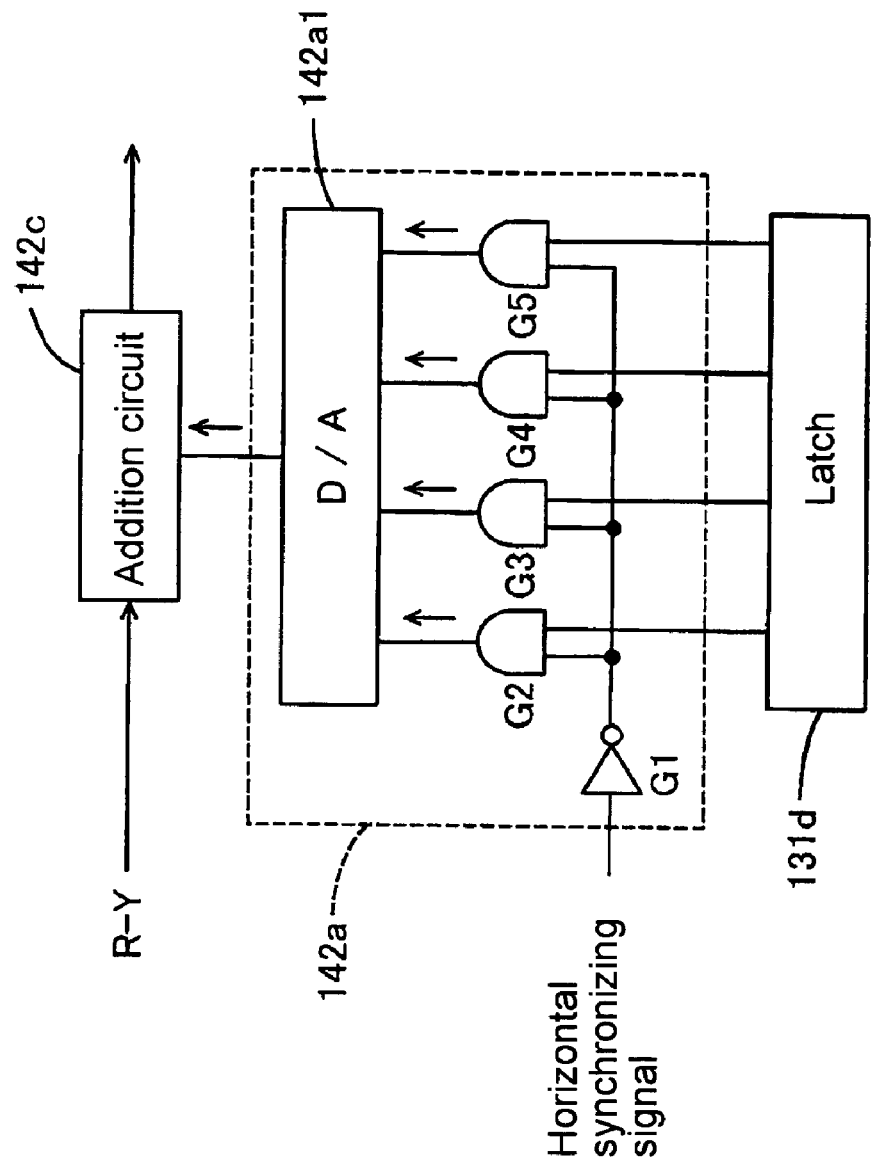
FIG. 4 is a circuit diagram showing a correction signal generating circuit together with an addition circuit and the latch circuit.

Correction signal generating circuits 142a and 142b can be comprised of gate circuits G1 to G5 and a D/A conversion circuit 142a1 as shown in, for example, FIG. 4. A digital output of 4 bits from latch circuits 131d and 131e of the control circuit 131 is converted into an analog voltage (for example, in a range of −50 mV to +50 mV) by the D/A converter 142a1, and sent to an addition circuit 142c. The output of 4 bits from the latch circuits 131d and 131e is inputted to inputs of the AND gates G2 to G5. The horizontal synchronizing signal (negative logic signal) is inverted by an inverter G1, while being buffered, and the inverted signal is inputted to an input of each of the AND gates G2 to G5. At this time, the output from the inverter G1 takes a value of "1" during a horizontal synchronization time of the horizontal synchronizing signal, and a value of "0" during a time other than the horizontal synchronization time. As a result, the analog voltage corresponding to the digital output from the latch circuits 131d and 131e only during the horizontal synchronization time is added to the R-Y and B-Y signals by the addition circuit 142c.

Note that if the horizontal synchronizing signal is a positive logic signal, a buffer gate may be used instead of the inverter gate G1.

The drive adjustment circuits 142e and 142f may each comprise a circuit mainly consisting of, for example, a gain control amplifier, and are provided corresponding to the color-difference signals R-Y and B-Y inputted, respectively. The drive adjustment circuits 142e and 142f are connected to the respective D/A conversion circuits 145c and 145d separately provided. The D/A conversion circuits 145c and 145d are connected to the latch circuits 131f and 131g of the control circuit 131, respectively. The drive adjustment circuits 142e and 142f respectively adjust the drive of the color-difference signals R-Y and B-Y according to output voltages from the D/A conversion circuits 145c and 145d to provide outputs to the matrix circuit 143.

The matrix circuit 143 combines the luminance signal Y and the color-difference signals R-Y and B-Y inputted, into three types of color signals of three primary colors, namely, the R signal, the G signal, and the B signal (which maybe also described as chrominance signals R, G, and B), and outputs these primary color signals to the cut-off adjustment circuit 144. When an image is displayed based on the TV signals in the PAL or SECAM system, the standardized YUV signal is fed to the matrix circuit 143, and converted into the R, G, and B signals according to the following conversion formula:

$R = Y + 1.140V$ $G = Y - 0.396U - 0.581V$ $B = Y + 2.029U$ wherein the Y component (luminance) is a value according to the CIE1931XYZ color coordinate system.

It is apparent that when the image is displayed based on the TV signal in the NTSC system or the like, a circuit for converting the standardized YCbCr signal into the color signals R, G, and B may be used as the matrix circuit.

The cur-off adjustment circuit 144 is composed of a circuit which mainly comprises, for example, a clamp circuit for applying a positive or negative DC voltage to the signals. The cut-off adjustment circuits 144 are provided corresponding to the respective color signals R, G, and B inputted. Each cut-off adjustment circuit 144 is connected to each of D/A conversion circuits 146 separately provided. (Note that in the figure, only one circuit into which all conversion circuits are put together for the purpose of simplification is schematically shown.) Each D/A conversion circuit 146 is connected to the control circuit 131. Each cut-off adjustment circuit 144 performs the cut-off adjustment of each of the color signals R, G, and B according to the output voltage of the corresponding D/A conversion circuit 146, and outputs the signals adjusted to the external video output circuit 161. More specifically, the DC voltage approximately in proportion to the output voltage of the D/A conversion circuit 146 is applied.

Turning now to FIG. 1, the video output circuit 161 amplifies the RGB signal from the video amplification-chroma circuit, and supplies the picture tube with the amplified signal. The deflection circuits 163 and 164 generates vertical and horizontal drive currents corresponding to vertical and horizontal drive signals respectively inputted, and feeds them to the deflection coils 165 and 166. The deflection coils 165 and 166 then generates a magnetic field within the picture tube 162, causing thermo-electrons emitted from a cathode towards a tube surface of the picture tube 162 to be driven in vertical and horizontal directions. The horizontal deflection circuit 164 outputs the high-frequency signal generated to the high voltage circuit 167, which generates high voltage using the high-frequency signal inputted, and supplies it to an anode of the picture tube 162. As a result, in the picture tube 162, the electron beams corresponding to the amplified color signals R, G, and B are emitted while being driven, whereby the image is displayed on the tube surface.

The audio signal is inputted to the low-frequency output circuit 171 and amplified therein. The amplified audio signal is inputted to the speaker 172, from which corresponding audio is outputted.

The control circuit 131 allows the pedestal level adjustment value, the cut-off adjustment value, and the drive adjustment value stored in the EEPROM 150 to be inputted thereto from the external microcomputer 110, and holds therein the adjustment values. The pedestal level adjustment value is a digital gradient value which has any one of 16 levels or values, for example, zero to 15 (a plurality of stepwise values), represented by four bits. The pedestal level adjustment values include a pedestal level adjustment value for V which is used to adjust a pedestal level of the R-Y signal and which has any one of the plurality of stepwise values, and a pedestal level adjustment value for U which is used to adjust a pedestal level of the B-Y signal and which has any one of the plurality of stepwise values. Likewise, the cut-off adjustment value and the drive adjustment value may be represented by a gradient value which has any one of a plurality of stepwise values. The pedestal level adjustment value, the drive adjustment value, and the cut-off adjustment value are outputted in digital form to the correction signal generating circuits 142a and 142b, and the D/A conversion circuits 145c, 145d, and 146. Then, analog voltages for adjustment of the pedestal level, drive, and cut-off are outputted to the adjustment circuits 142 and 144. Accordingly, the control circuit 131 can adjust the black and white levels of the image by performing adjustment processing by an amount corresponding to the adjustment value according to an instruction from the microcomputer 110.

With this arrangement, the pedestal level adjustment circuits 142a to 142d adjust the pedestal level of the R-Y signal by an amount of adjustment according to the pedestal level adjustment value for V stored in the semiconductor memory 131b in the horizontal synchronization time of the horizontal synchronizing signal separated from the video signal, as well as the pedestal level of the B-Y signal by an amount of adjustment according to the pedestal level adjustment value for U stored in the semiconductor memory 131b. The video display units 161 to 167 display the image from the picture tube based on the video signal after the adjustment.

Figure 5:
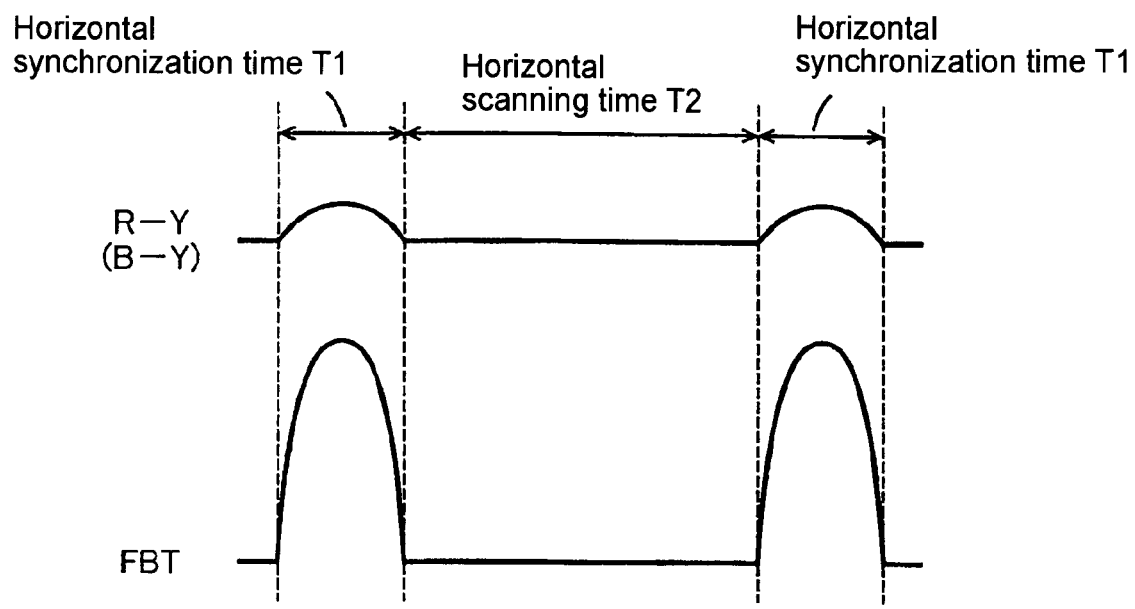
FIG. 5 is a diagram showing a state of deviation in pedestal level of a color-difference signal during a horizontal synchronization time.
Figure 5:
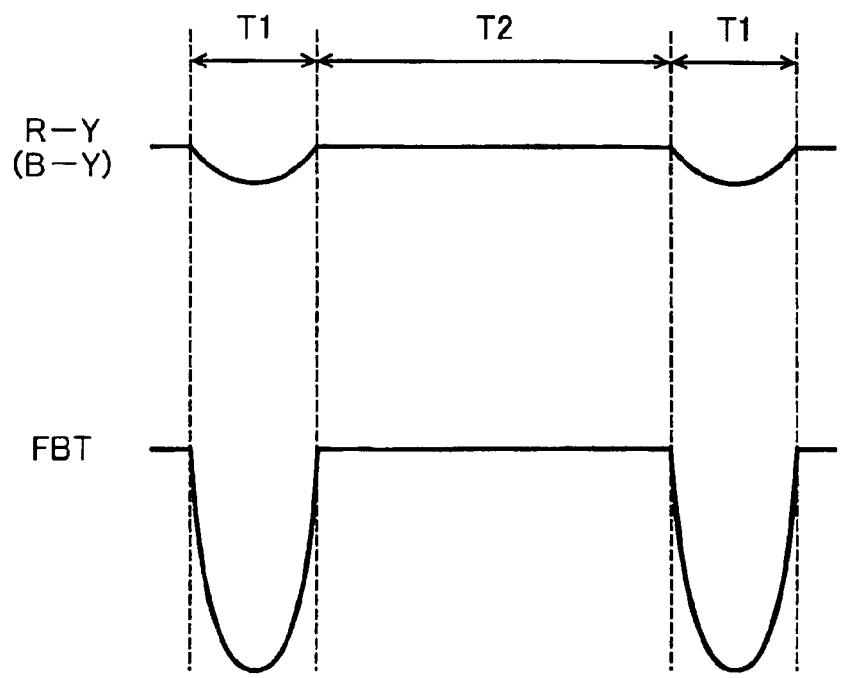
Figure 6:
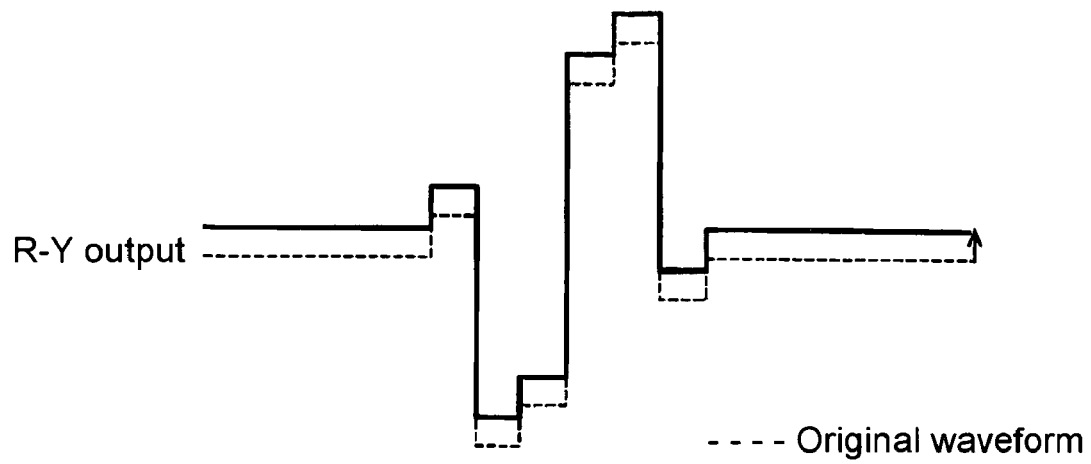
FIG. 6 is a diagram showing a state of deviation in waveform of the color-difference signal due to electric noise.
Figure 6:
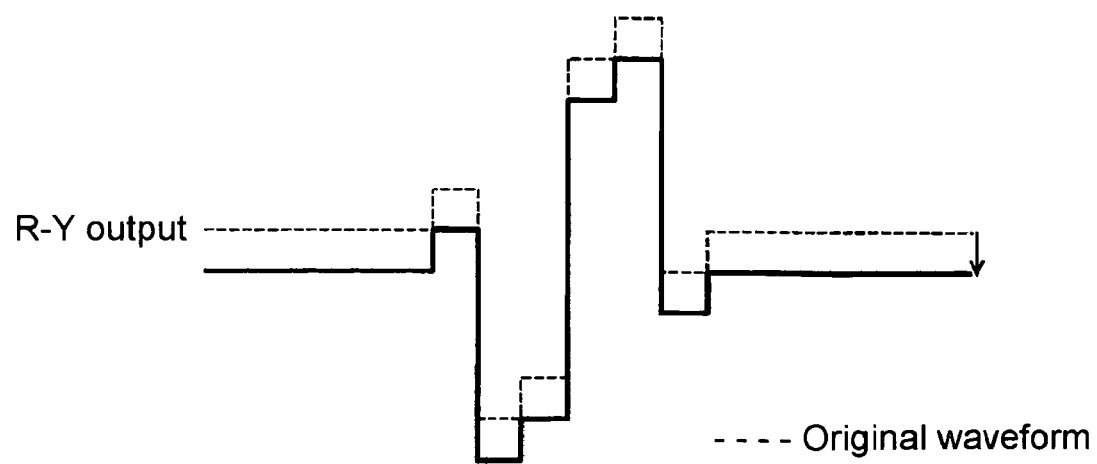

As shown in FIG. 5, electric noise may be jumped into the R-Y and B-Y signals from the FBT in the horizontal synchronization time T1, resulting in deviation in the pedestal level in the horizontal synchronization time T1 with respect to the pedestal level in the horizontal scanning time T2. This deviation occurs depending on types of circuits or components of the TV in the following cases. For example, when the electric noise with positive potential caused by the FBT is jumped into the R-Y and B-Y signals in the horizontal synchronization time T1 as shown in an upper diagram of FIG. 5, the pedestal level deviates in a direction of positive potential. Alternatively, when the electric noise with negative potential caused by the FBT is jumped into the R-Y and B-Y signals in the horizontal synchronization time T1 as shown in a lower diagram thereof, the pedestal level deviates in a direction of negative potential. When the black level is heightened due to the electric noise, as shown in an upper diagram of FIG. 6, the R-Y and B-Y signals each have a waveform (part described by a solid line) that is shifted from an appropriate waveform (part described by a broken line) towards the higher potential. When the black level is lowered due to the electric noise, as shown in a lower diagram of FIG. 6, the R-Y and B-Y signals each have a waveform (part described by a solid line) that is shifted from the appropriate waveform (part described by the broken line) towards the lower potential. In the conventional television manufacturing plant, the operator connects the TV to a computer, makes efforts to enter a pedestal level adjustment value into the computer so as to decrease deviation in the pedestal level as much as possible in the horizontal synchronization time T1, and writes the pedestal level adjustment value in the chroma IC from the computer via the IIC bus of the TV. This involves complicated procedures, resulting in time-consuming tasks.

In the present embodiment, there are provided the amplification circuits 145a, 145b, O1, and O2, and the smoothing circuits R1, R2, C1, and C2, whereby the pedestal level of the video signal in the horizontal synchronization time T1 is detected. Based on the pedestal level detected, the pedestal level adjustment value is determined so as to lessen a difference between a pedestal level of the video signal in the horizontal synchronization time T1 and a pedestal level of the video signal in a horizontal scanning time T2 of the horizontal synchronizing signal. The pedestal level adjustment value determined is stored in the memory 131b of the video amplification-chroma circuit. This can eliminate the necessity of complicated adjustment of the pedestal level of the video signal.

Figure 7:
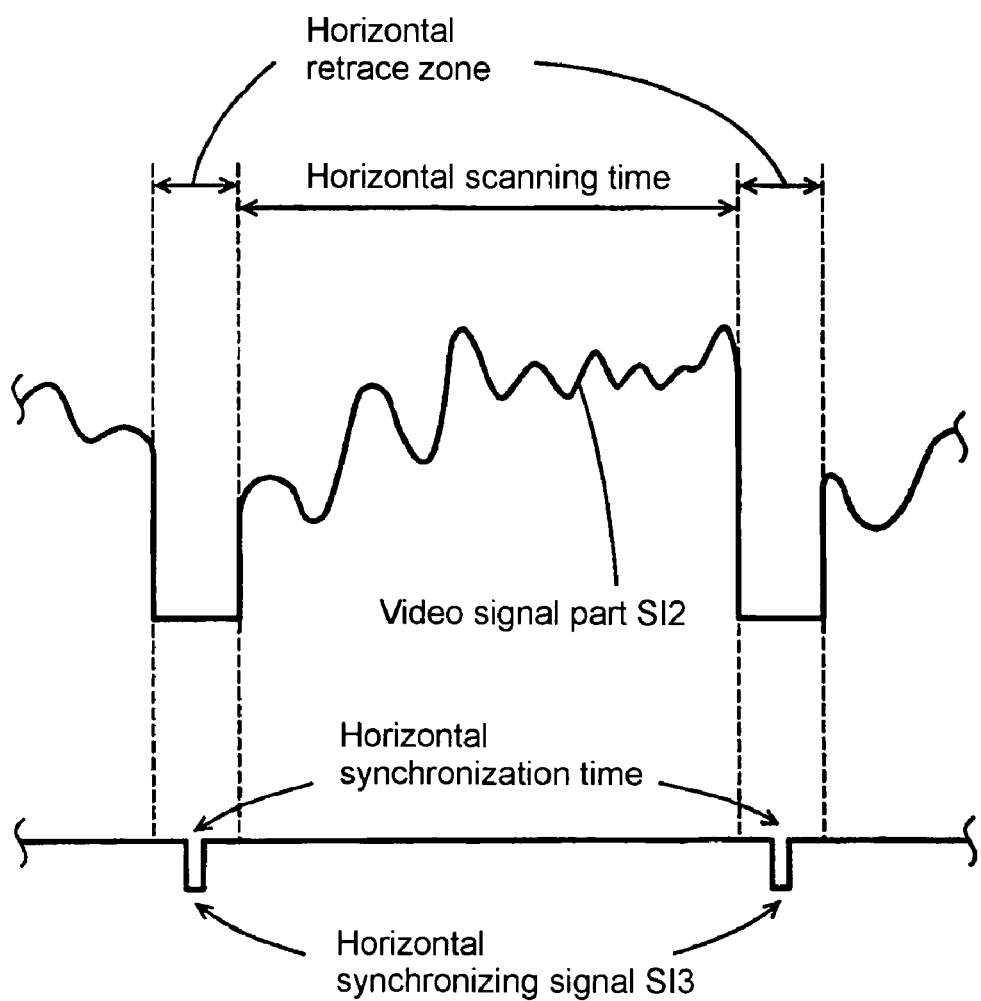
FIG. 7 is a schematic diagram of a video signal.

For example, as shown in FIG. 7, a video signal SI1 has a video signal part SI2 in the horizontal scanning time other than a horizontal retrace time. The horizontal synchronization time of the horizontal synchronizing signal S13 is within the horizontal retrace time.

The amplification circuits O1 and O2 can be, for example, a well-known difference amplification circuit using an operational amplifier. The amplification circuits O1 and O2 have inputs thereof connected to the PV and PU signals from the amplification circuits 145a and 145b, respectively, and to the ground, and have outputs thereof connected to ends of resistors R1 and R2. The circuits O1 and O2 respectively amplify the PV and PU signals with reference to the ground potential to generate an amplified signal for V and an amplified signal for U, and output the amplified signals to the resistor R1 and R2. It should be noted that the amplification circuits 145a, 145b, O1, and O2 are amplification circuits which respectively amplify the red and blue color-difference signals with reference to the ground potential to generate the amplified signals for V and U.

The resistors R1 is connected between the amplification circuit O1 and the A/D conversion circuit 116 of the microcomputer, and the resistor R2 is connected between the amplification circuit O2 and the A/D conversion circuit 117 of the microcomputer. The capacitor C1 is connected between the ground and a junction point between the resistor R1 and the A/D conversion circuit 116. The capacitor C2 is connected between the ground and a junction point between the resistor R2 and the A/D conversion circuit 117. The resistors R1 and R2, and the capacitors C1 and C2 constitute smoothing circuits for smoothing the amplified signals for V and U generated by the amplification circuits O1 and O2, respectively.

The A/D conversion circuits 116 and 117 of the microcomputer respectively generate in digital form an amplified signal value for V and an amplified signal value for U corresponding to and from the V and U amplified signals smoothed.

Figure 8:
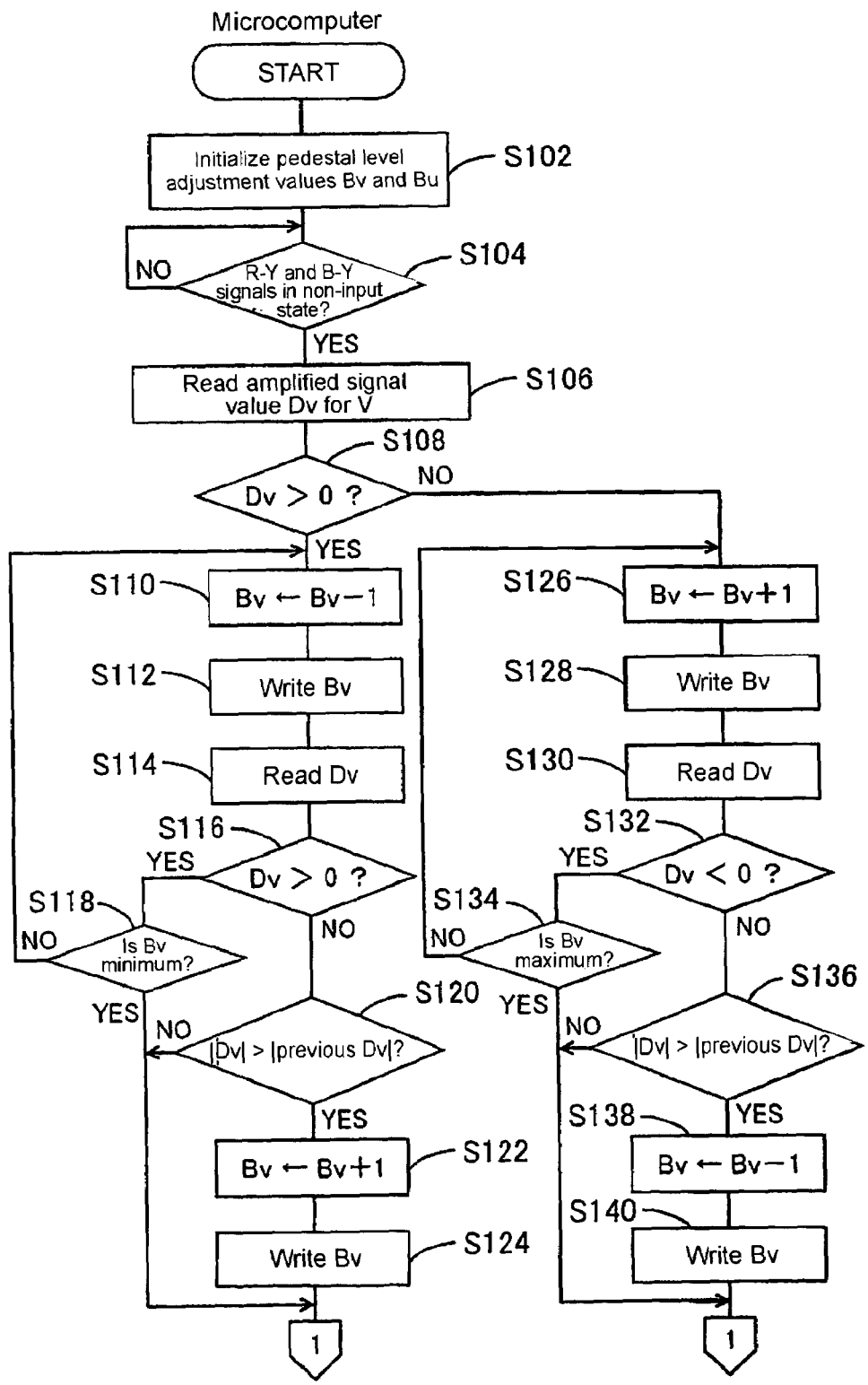
FIG. 8 is a flowchart showing pedestal level adjustment processing performed by a microcomputer.
Figure 9:
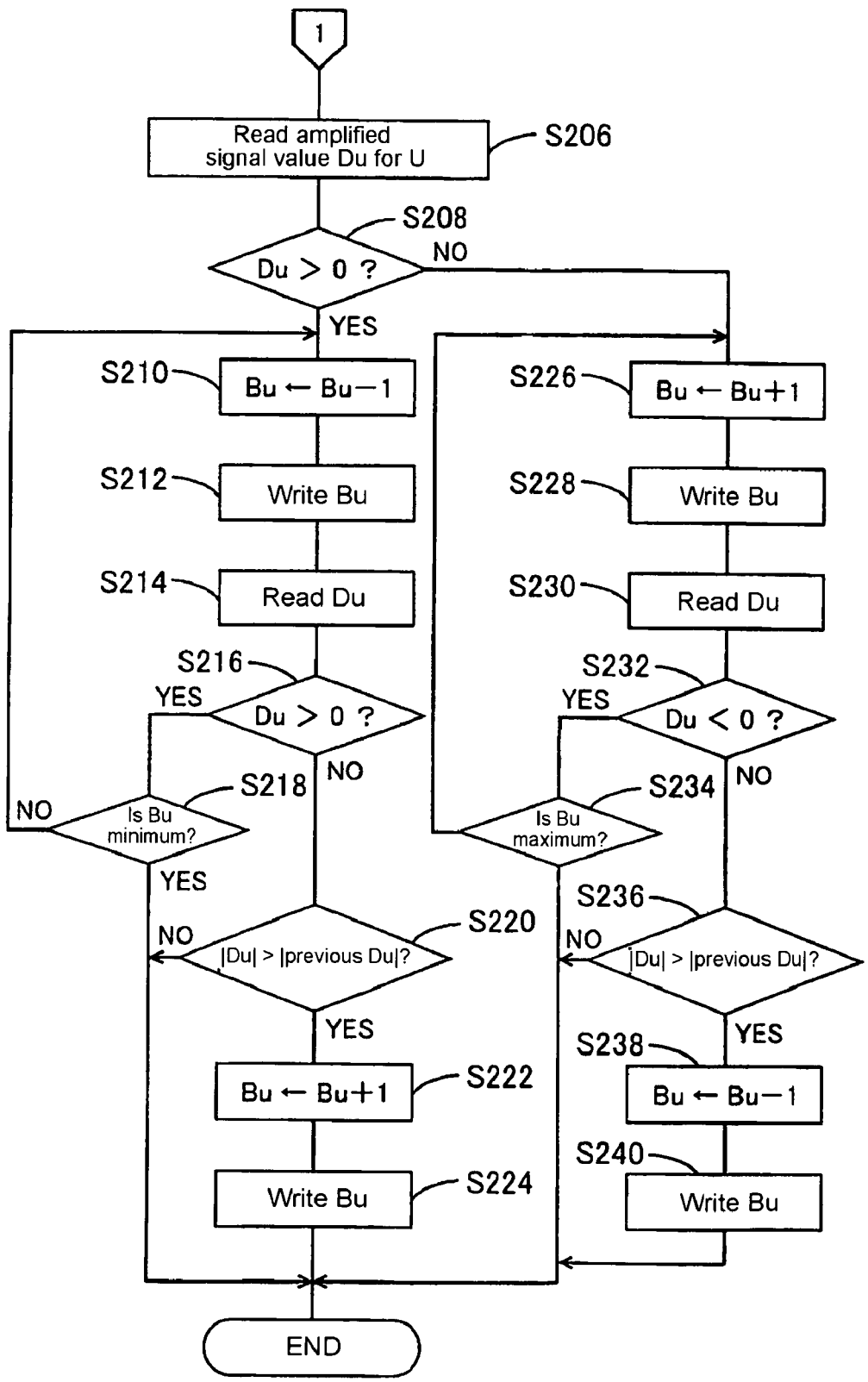
FIG. 9 is a flowchart showing pedestal level adjustment processing performed by the microcomputer.
Figure 10:
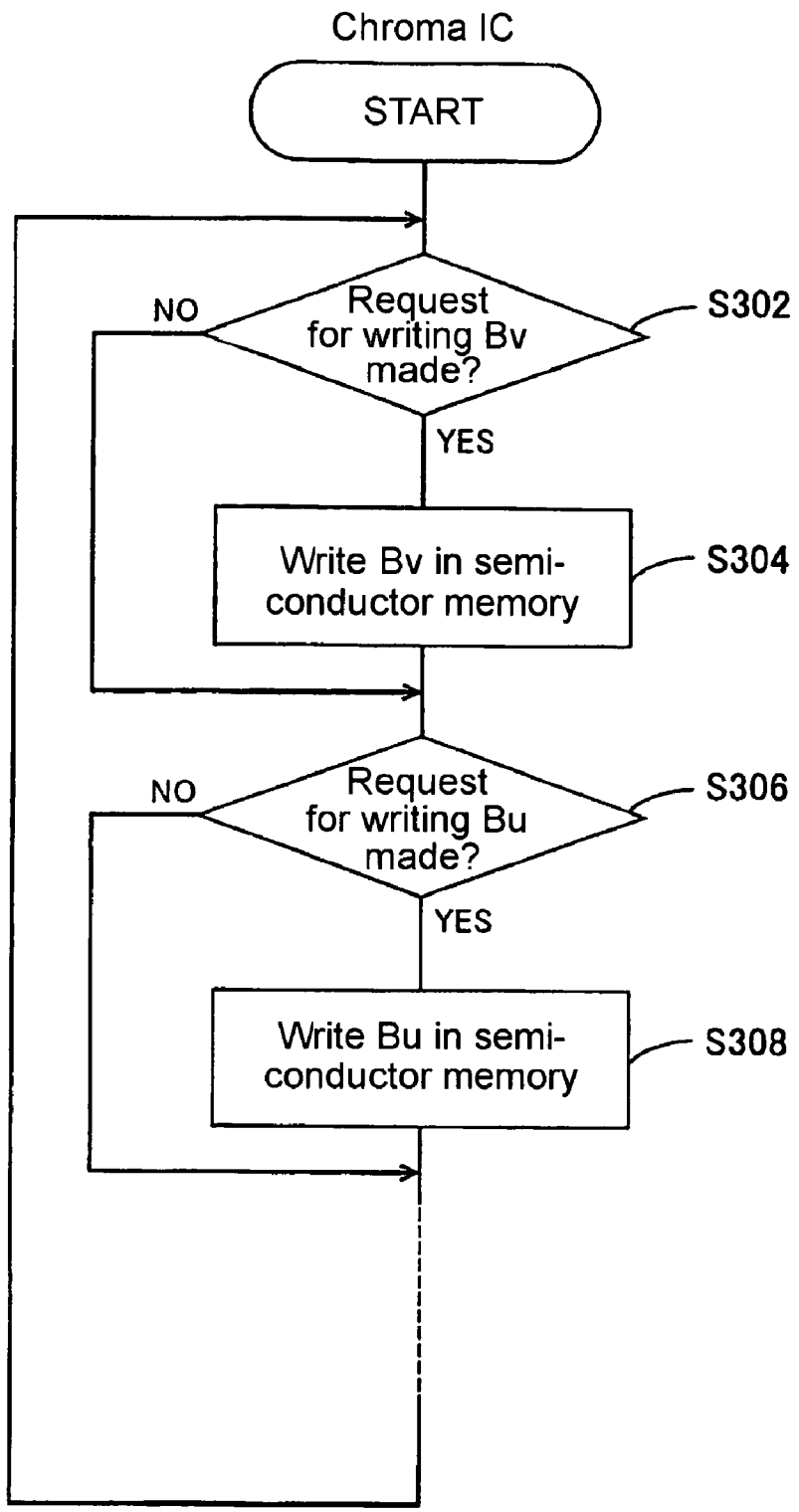
FIG. 10 is a flowchart showing processing performed by a chroma IC.

(2) Pedestal Level Adjustment Processing:

FIGS. 8 and 9 illustrate flowcharts of pedestal level adjustment processing performed by the microcomputer 110. FIG. 10 illustrates a flowchart of processing performed by the chroma IC constituting a part of the video amplification-chroma circuit 130. It should be noted that the amplification circuits 145a, 145b, O1, and O2, the smoothing circuits R1, R2, C1, and C2 and the A/D conversion circuits 116 and 117 constitute a detecting section, the microcomputer 110 for performing processing at steps S102 to steps S110, S114 to S122, S126, S130 to S138, S208 to S210, S214 to S222, S226, S230 to S238 (in the following, the term "step" being omitted) constitutes an adjustment value determination section, and the microcomputer 110 for performing processing at steps S112, S124, S128, S140, S212, S224, S228, and S240, and the chroma IC for performing processing at steps S302 to S308 constitute an adjustment value storage section. Note that the pedestal level of the color-difference signal in the horizontal synchronization time is adjusted in the last adjustment step to be performed in the TV manufacturing plant.

First, a variable Bv representing the pedestal level adjustment value for V and a variable Bu representing the pedestal level adjustment value for U are initialized (S102). The Bv and Bu may have any one of 16 levels of integers, namely, zero to 15, which is to be increased by addition within −50 mV to +50 mV with respect to the pedestal level in the horizontal scanning time. At the initialization time, for example, an approximately intermediate value (eight or seven) corresponding to 0 mV is substituted into each of the Bv and the Bu. Then, it is determined whether or not the R-Y and B-Y signals are in a state of not being inputted to the video amplification-chroma circuit. Until this condition is satisfied, the above step will be repeated (S104). For example, for a specification causing an operator in a plant to perform a predetermined input operation for indicating a pedestal level adjustment mode to the operation panel 119 with the component video input terminals for UV 183 and 184 being in a non-input state, it may be determined whether the predetermined input operation to the operation panel 119 is performed or not. Alternatively, signals for switching the switching circuits S1 and S2 to the non-input side may be outputted from the I/Os 114 and 115 of the microcomputer to the switching circuits S1 and S2, thereby ending the step S104, where the UV signal may not be inputted to the terminals 183 and 184, causing the R-Y and B-Y signals to be in the non-input state to the amplification-chroma circuit.

Thereafter, the A/D conversion circuits 116 and 117 generates an amplified signal value Dv for V and an amplified signal value Du for U in the state where the R-Y and B-Y signals are not being inputted to the video amplification-chroma circuit. Thus, by generating the amplified signal values in the state where the U and V signals are not being inputted from the U and V video input terminals 183 and 184 (or in the state where the color-difference signals are not being inputted to the video input section), the pedestal levels of the R-Y and B-Y signals in the horizontal synchronization time are detected. That is, at a step S106, the amplified signal value Dv for V is read from the A/D conversion circuit 116, thereby detecting the pedestal level of the R-Y signal in the horizontal synchronization time. It is determined whether or not the amplified signal value Dv for V is larger than zero (S108).

If Dv>0, the variable Bv value is decreased by one (S110), and then the Bv value thus-obtained is written in the chroma IC via the IIC bus 101 (S112). The chroma IC determines whether or not a request for writing the pedestal level adjustment value for V is entered from the microcomputer 110 (S302). If the condition is satisfied, that is, if yes, the Bv value is written in the memory 131b of the control circuit (S304). Then, in the video amplification-chroma circuit 130, the Bv value stored in the memory 131b is latched by the latch circuit 131d, and the digital Bv value is converted into analog voltage in the horizontal synchronization time by the correction signal generating circuit 142a. The analog voltage from the correction signal generating circuit 142a is added to the R-Y signal in the horizontal synchronization time by the addition circuit 142c. Thus, in the horizontal synchronization time, the pedestal level of the R-Y signal is adjusted by the amount of adjustment according to the Bv value (in the range of −50 mV to +50 mV). Then, the amplified signal value Dv for V is read again from the A/D conversion circuit 116 (S114). It is determined again whether or not the amplified signal value Dv for V is larger than zero (S116).

Although for Dv>0 the Bv value should be further decreased, if the present Bv value is a minimum value, the Bv value cannot be decreased. Thus, it is determined whether the Bv value is minimum or not (S118). If the condition is not satisfied, that is, if no, the operation proceeds to the step S110. If the condition is satisfied, that is, if yes, the operation proceeds to a step S206. In this case, the pedestal level adjustment value for V is determined to be minimum.

If Dv≦0 at the step S116, it is determined whether or not an absolute value of the Dv value currently read is larger than that of a Dv value previously read (S120). If the condition is not satisfied, that is, if no, it is judged that the present Dv value is more close to zero than the previous Dv value, or that the difference between the present Dv value and zero is equal to that between the previous Dv value and zero. Then, the operation proceeds to the step S206. In this case, the pedestal level adjustment value for V is determined to be the present Bv value. On the other hand, if the condition is satisfied, that is, if yes at the step S120, since the previous Dv value is more close to zero than the present Dv value, the variable Bv is increased by one (S122), and then the Bv thus-obtained is written in the chroma IC via the IIC bus 101 (S124). Thereafter, the operation will proceed to the step S206. In this case, the pedestal level adjustment value for V is determined to be the previous Bv value.

If the condition is not satisfied, that is, if no at the step S108, the variable Bv is increased by one (S126), and then the Bv thus-obtained is written in the chroma IC via the IIC bus 101 (S128). subsequently, this new Bv value is written in the memory 131b of the control circuit, and the pedestal level of the R-Y signal in the horizontal synchronization time is adjusted by an amount of adjustment according to the Bv value stored (in a range of −50 mV to +50 mV). Thereafter, an amplified signal value Dv for V is read from the A/D conversion circuit 116 (S130), and it is determined whether or not the amplified signal value Dv for V is smaller than zero (S132).

Although for Dv<0 the Bv value should be further increased, if the present Bv value is a maximum value, the Bv value cannot be further increased. Thus, it is determined whether the Bv value is maximum or not (S134). If the condition is not satisfied, that is, if no, the operation returns to the step S126. If the condition is satisfied, that is, if yes, the operation proceeds to the step S206. In this case, the pedestal level adjustment value for V is determined to be maximum.

If Dv≧0 at the step S132, it is determined whether or not an absolute value of the Dv value currently read is larger than that of a Dv value previously read (S136). If the condition is not satisfied, that is, if no, it is judged that the present Dv value is more close to zero than the previous Dv value, or that the difference between the present Dv value and zero is equal to that between the previous Dv value and zero. Then, the operation proceeds to the step S206. In this case, the pedestal level adjustment value for V is determined to be the present Bv value. On the other hand, if the condition is satisfied, that is, if yes at the step S136, since the previous Dv value is more close to zero than the present Dv value, the variable Bv is decreased by one (S138), and then the Bv thus-obtained is written in the chroma IC via the IIC bus 101 (S140). Thereafter, the operation will proceed to the step S206. In this case, the pedestal level adjustment value for V is determined to be the previous Bv value.

In the processing described above, the microcomputer 110 can select and determine the pedestal level adjustment value for V from among the sixteen levels, based on the amplified signal value for V generated in the state where the R-Y signal is not being inputted to the video amplification-chroma circuit, in such a manner that the amplified signal value for V generated by the A/D conversion circuit 116 takes a value that is most close to zero (the difference or deviation in pedestal level of the R-Y signal is lessen). Then, the pedestal level adjustment value for V determined can be outputted to the video amplification-chroma circuit 130, which stores the adjustment value for V determined in the memory 131b of the control circuit.

As shown in steps S206 to S240 of FIG. 9, it is understood that processing for determination and writing of the pedestal level adjustment value for U is like that of the pedestal level adjustment value for V. The chroma IC determines whether or not a request for writing the pedestal level adjustment value for U is entered from the microcomputer 110 (S306). If the condition is satisfied, that is, if yes, the Bu value is written in the memory 131b of the control circuit (S308). Then, in the video amplification-chroma circuit 130, the Bu value stored in the memory 131b is latched by the latch circuit 131e, and the digital Bu value is converted into analog voltage in the horizontal synchronization time by the correction signal generating circuit 142b. The analog voltage from the correction signal generating circuit 142b is added to the B-Y signal in the horizontal synchronization time by the addition circuit 142b. Thus, in the horizontal synchronization time, the pedestal level of the B-Y signal is adjusted by an amount of adjustment according to the Bu value (in the range of −50 mV to +50 mV).

In the processing described above, the microcomputer 110 can select and determine the pedestal level adjustment value for U from among the sixteen levels, based on the amplified signal value for U generated in the state where the B-Y signal is not being inputted to the video amplification-chroma circuit, in such a manner that the amplified signal value for U generated by the A/D conversion circuit 117 takes a value that is most close to zero (the difference or deviation in pedestal level of the B-Y signal is lessen). Then, the pedestal level adjustment value for U determined can be outputted to the video amplification-chroma circuit 130, which stores the pedestal level adjustment value for U determined in the memory 131b of the control circuit.

Figure 11:
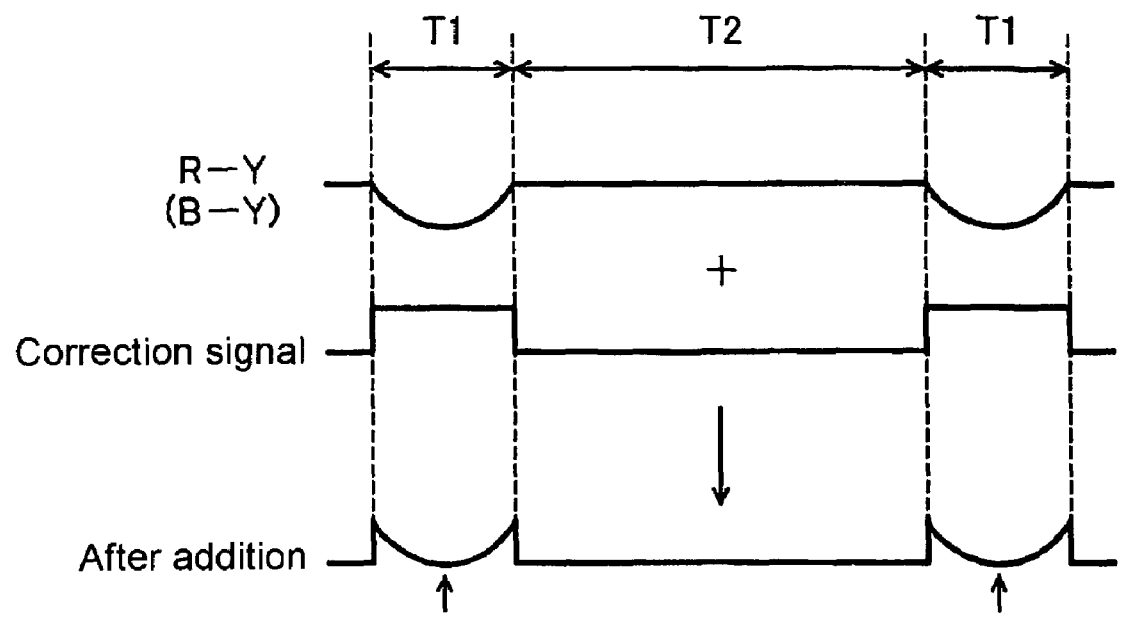
FIG. 11 is a schematic diagram of a state of adjustment of the pedestal level in the horizontal synchronization time.
Figure 11:
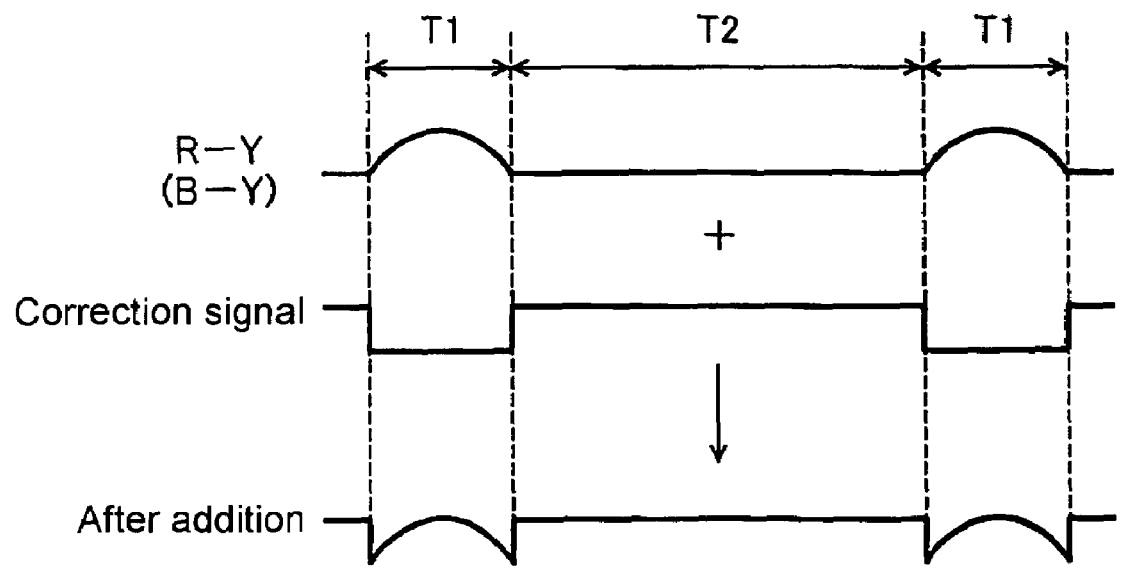

With this arrangement, as shown in FIG. 11, even if deviations in the pedestal levels of the R-Y and B-Y signals are caused by electric noise jumped into the R-Y and B-Y signals from the FBT in the horizontal synchronization time T1, correction signals to be added to the R-Y and B-Y signals in the horizontal synchronization time are generated by the correction signal generating circuits 142a and 142b. More specifically, when the pedestal level of the R-Y or B-Y signal is shifted in the direction of negative potential as illustrated in the upper diagram of FIG. 2, the pedestal level adjustment value is increased to generate the correction signal of positive potential. In contrast, when the pedestal level of the R-Y or B-Y signal is shifted in the direction of positive potential as illustrated in the lower diagram of FIG. 2, the pedestal level adjustment value is decreased to generate the correction signal of negative potential. Thus, the pedestal level of the color-difference signal is automatically adjusted such that the deviation in pedestal level of the color-difference signal is lessen, more specifically, such that the pedestal level thereof in the horizontal synchronization time T1 is identical to that in the horizontal scanning time T2, thereby eliminating the necessity of complicated adjustment procedures of the pedestal level of the color-difference signal.

With the color-difference signals U and V not being inputted to the video amplification-chroma circuit, the R-Y and B-Y signals are at the pedestal level in a time other than the horizontal synchronization time. In this state, smoothing the R-Y and B-Y signals by the smoothing circuits R1, R2, C1, and C2 with reference to the ground potential enables detection of the pedestal level in the horizontal synchronization time which may be shifted or deviated due to the electric noise jumped into the R-Y and B-Y signals from the FBT in the horizontal synchronization time. Accordingly, the need for the adjustment procedures of the pedestal level of the color-difference signal can be eliminated with the simple structure without detecting the pedestal levels both in the horizontal synchronization time and in the horizontal scanning time. At this time, the R-Y and B-Y signals are amplified by the amplification circuits 145a, 145b, O1, and O2, so that the pedestal levels of the R-Y and B-Y signals can be more surely detected and adjusted.

Since the pedestal level adjustment value is determined in such a manner that each of the amplified signal values generated by the A/D conversion circuits 116 and 117 takes a value that is most close to zero with the U and V color-difference signals not being inputted to the amplification-chroma circuit, the pedestal level of the color-difference signal is adjusted so as to minimize the deviation in the pedestal level in the horizontal synchronization time, which leads to the reliable adjustment of the pedestal level of the color-difference signal.

(3) Variations:

It is thought that various variations can be made to the invention.

Televisions to which the invention can be applied include a television having a picture tube, a liquid crystal television, and a plasma television. The television may be a single device, an integrated device into which a video deck, a DVD deck, and a television are integrated, or any other appropriate device which is attached to another apparatus, or integrated into another system.

In addition to the above-mentioned R-Y and B-Y signals, Cr and Cb signals may serve as the video signal whose pedestal level is to be adjusted. Alternatively, in addition to the color-difference signals, three primary color signals including the R signal, the G signal, and the B signal may also serve as the video signal for adjustment of interest.

The amplification circuit for amplifying the color-difference signals may be only the amplification circuits O1 and O2, only the amplification circuits 145a and 145b, or the amplification circuits 145a, 145b, O1, and O2 with other components added thereto.

The smoothing circuits for smoothing the amplified signals may be only the above-mentioned capacitors C1 and C2, or a circuit including the above-mentioned elements R1, R2, C1, and C2 with other components added thereto.

Figure 12:
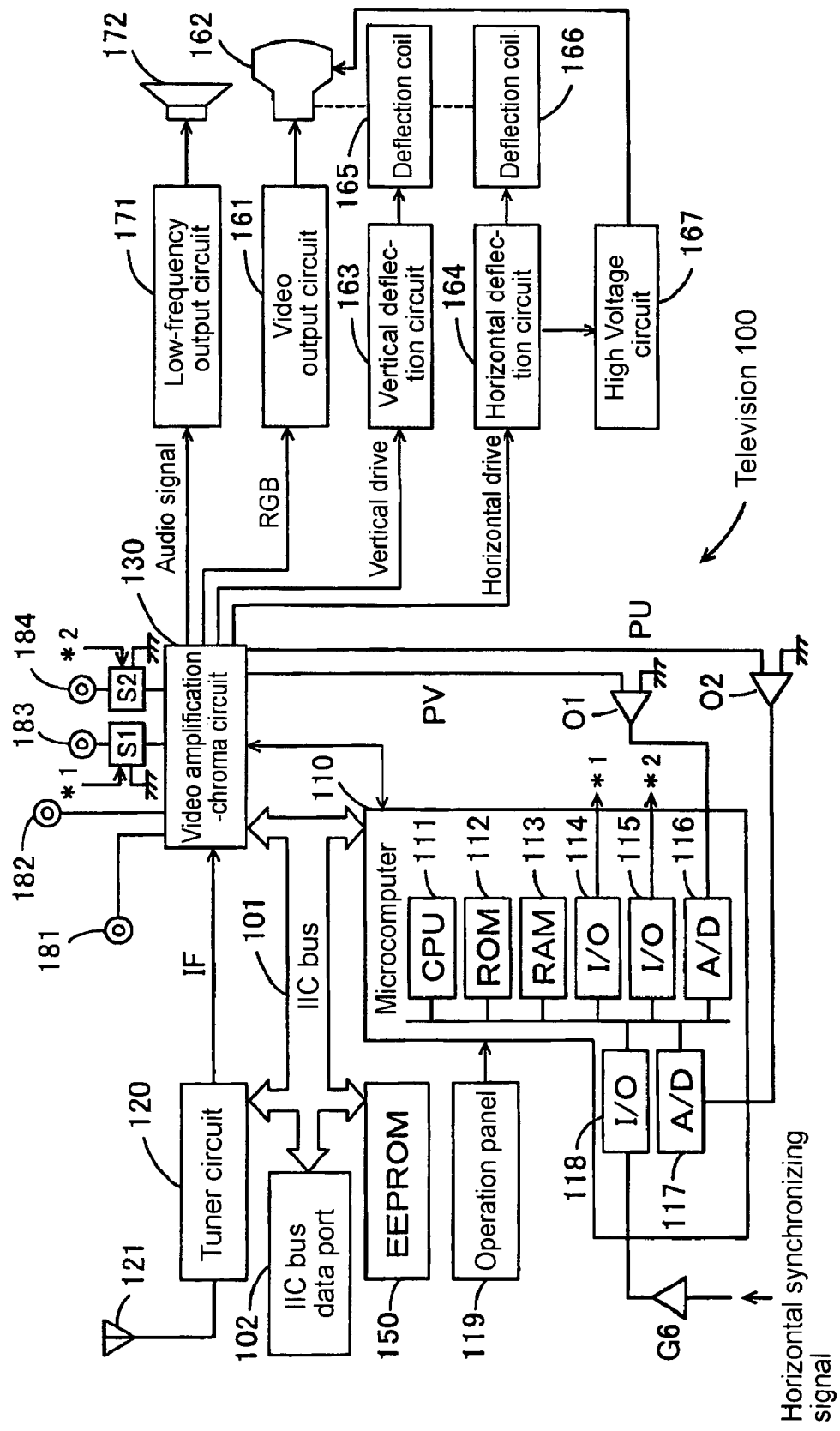
FIG. 12 is a block diagram showing a modified example of the television.

As shown in FIG. 12, the television may have a structure for detecting the pedestal level of the color-difference signal without having the smoothing circuit. That is, outputs from the amplification circuits O1 and O2 are directly inputted into the A/D conversion circuits 116 and 117. The microcomputer 110 is provided with an I/O port 118, to which the horizontal synchronizing signal from the first video amplification circuit 134 is inputted via the buffer gate G6. In a present modified example, the amplification circuits 145a, 145b, O1, and O2 amplify the R-Y and B-Y signals with reference to the ground potential to generate the amplified signals for V and U. The A/D conversion circuits 116 and 117 generate a digital amplified signal value for V and a digital amplified signal value for U corresponding to and from the amplified signals for V and U.

Figure 13:
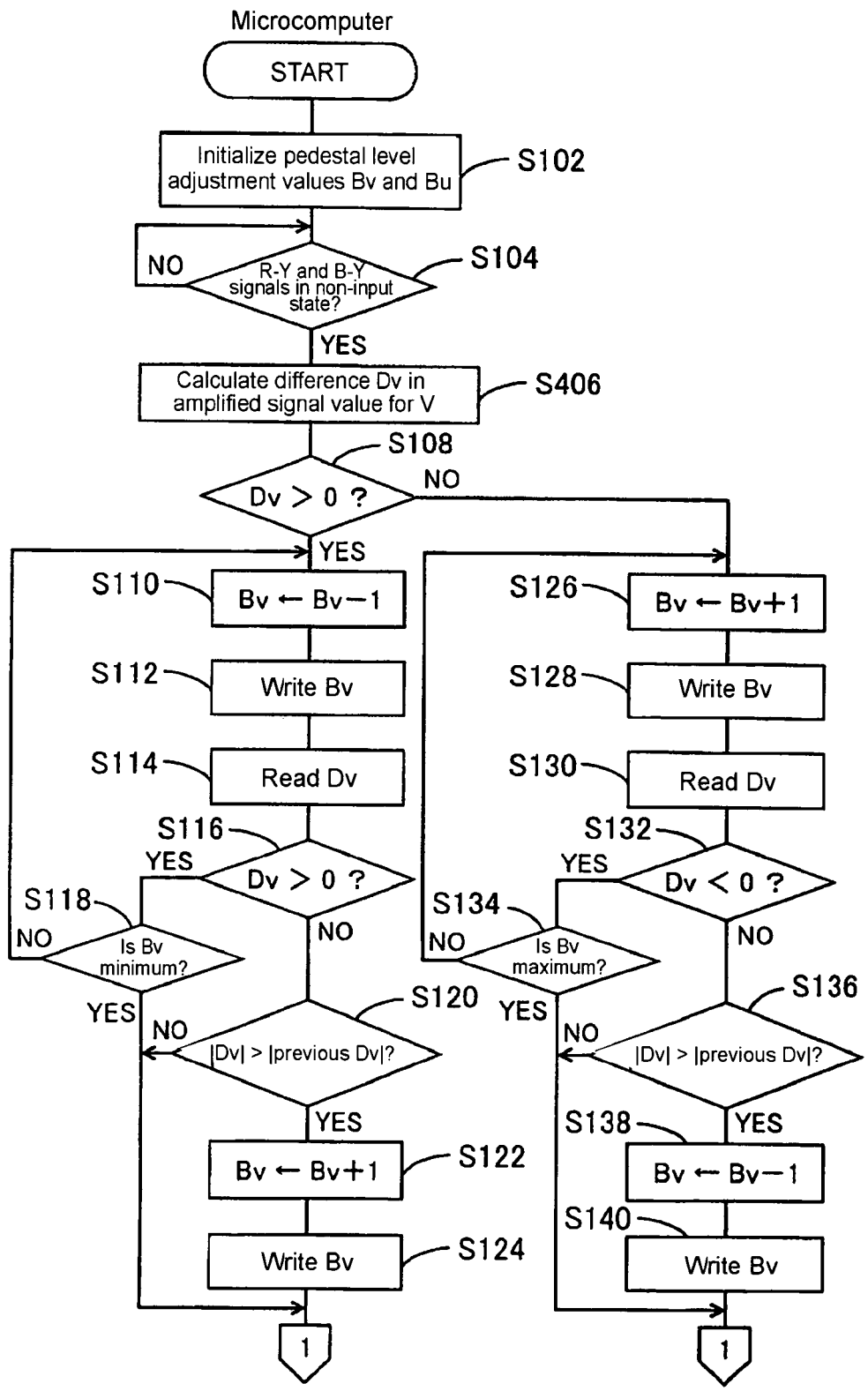
FIG. 13 is a flowchart showing pedestal level adjustment processing performed by the microcomputer in the modified example.

FIG. 13 shows a flowchart of pedestal level adjustment processing performed by the microcomputer 110 in the modified example. The microcomputer 110 for performing the processing at the step S406, and the buffer gate G1 constitute the difference calculator. It should be noted that when each of the amplified signal values Dv and Du shown in the flowcharts of FIGS. 8 and 9 is replaced by a difference in the amplified signal value, if processing for determining the difference in the amplified signal value is performed at the steps S106 or S206, steps other than the difference determination step can be represented in the same flowchart as that of FIG. 8 or 9. The processing at the step S406 will be described hereinafter in detail.

Figure 14:
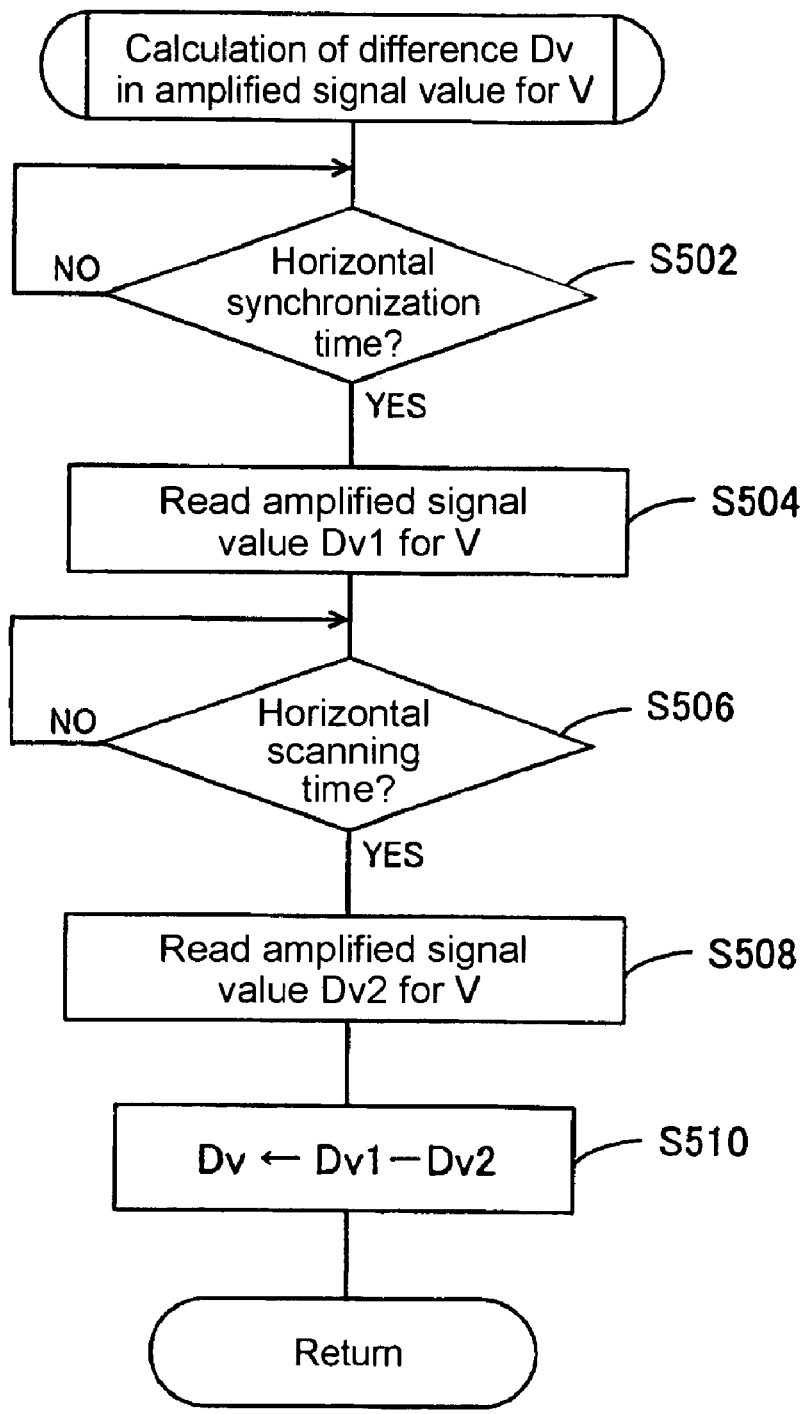
FIG. 14 is a flowchart showing processing for determining a difference in amplified signal value.

FIG. 14 illustrates a flowchart of the processing for calculating or determining a difference Dv in the amplified signal value for V performed at the step S406. First, reading from the I/O port 118, it is determined whether or not the horizontal synchronizing signal is in the horizontal synchronization time (S502). If it is not in the horizontal synchronization time, that is, if no, the determination processing at the step S502 is repeated. If it is in the horizontal synchronization time, that is, if yes, the amplified signal value Dv1 for V is read from the A/D conversion circuit 116 (S504). The amplified signal value Dv1 is a digital value corresponding to the pedestal level of the R-Y signal in the horizontal synchronization time.

Then, it is determined whether or not the video signal is present in the horizontal scanning time (S506). For example, it is determined whether a predetermined time has passed or not since determination of the horizontal synchronizing signal in the horizontal synchronization time at the step S502, using a timer circuit of the microcomputer 110, whereby the determination processing of the step S506 can be performed. Note that reading from the I/O port 118, it may be determined whether or not the horizontal synchronizing signal is present in a time other than the horizontal synchronization time. If the video signal is not present in the horizontal scanning time, the determination processing at the step S506 is repeated. If it is present in the horizontal scanning time, the amplified signal value Dv2 for V is read from the A/D conversion circuit 116 (S508). The amplified signal value Dv2 is a digital value corresponding to the pedestal level of the R-Y signal in the horizontal scanning time.

A difference Dv in the amplified signal value for V is determined by subtracting the amplified signal value Dv2 in the horizontal scanning time from the amplified signal value Dv1 in the horizontal synchronization time (S510), whereby the flow of the processing is ended. The processing described above can be carried out to determine the difference in the amplified signal value for V between in the horizontal synchronization time and in the horizontal scanning time in the state where the V signal is not inputted from the V video input terminal 184. This can detect the pedestal level of the R-Y signal in the horizontal synchronization time.

Thereafter, by performing the processing at the steps S108 to S140, a pedestal level adjustment value for V is selected and determined from among a plurality of levels, based on the difference Dv in amplified signal value determined when the R-Y signal is not being inputted, in such a manner that the difference Dv in amplified signal value (the difference between the amplified signal value in the synchronization time and the amplified signal value in the scanning time) generated by the A/D conversion circuit 116 is most close to zero (lessened), and then the pedestal level adjustment value determined is written in the chroma IC.

Although not shown in the figure, the pedestal level adjustment value for U may be obtained by performing processing in which the processing at the step S206 of the flowchart of FIG. 9 is replaced by processing similar to that shown in FIG. 14. Thus, a pedestal level adjustment value for U is selected and determined from among a plurality of levels, based on the difference Du in amplified signal value determined when the B-Y signal is not being inputted, in such a manner that the difference Du in amplified signal value (the difference between the amplified signal value in the synchronization time and the amplified signal value in the scanning time) generated by the A/D conversion circuit 117 is most close to zero (lessened). Then the pedestal level adjustment value determined is written in the chroma IC.

With this arrangement, as shown in FIG. 11, even if deviations in the pedestal level of the color-difference signals are caused by electric noise jumped into the color-difference signals from the high voltage circuit 167 in the horizontal synchronization time T1, correction signals to be added to the R-Y and B-Y signals in the horizontal synchronization time are generated by the correction signal generating circuits 142a and 142b. Thus, the pedestal level of the color-difference signal is automatically adjusted such that the deviation in pedestal level of the color-difference signal is lessen, more specifically, such that the pedestal level thereof in the horizontal synchronization time T1 is identical to that in the horizontal scanning time T2, thereby eliminating the necessity of complicated adjustment procedures of the pedestal level of the color-difference signal.

Thus, the pedestal levels of the color-difference signal both in the horizontal synchronization time and in the horizontal scanning time are detected, and the pedestal level of the color-difference signal in the synchronization time is automatically adjusted so as to lessen the difference between the levels based on the pedestal levels detected. Accordingly, the pedestal levels of the color-difference signal can be adjusted well with more reliability. At this time, the R-Y and B-Y signals are amplified by the amplification circuits 145a, 145b, O1, and O2, so that the pedestal levels of the R-Y and B-Y signals can be detected and adjusted more surely.

The pedestal level adjustment value is determined in such a manner that the difference in the amplified signal value between in the synchronization and scanning times, which signal value is generated by either of the A/D conversion circuit 116 and 117, is most close to zero with the U and V color-difference signals not being inputted to the amplification-chroma circuit. Thus, the pedestal level of the color-difference signal is adjusted so as to minimize the deviation in the pedestal level thereof in the horizontal synchronization time. This leads to the reliable adjustment of the pedestal level of the color-difference signal in the synchronization time.

As can be seen from the above description, in various exemplary embodiments of the invention, the pedestal level of each of the R-Y and B-Y signals (color-difference signals) in the horizontal synchronization time T1 of the synchronizing signal is detected, and the pedestal level adjustment value is determined based on the pedestal level determined in such a manner that the difference in pedestal level of each of the R-Y and B-Y signals between in the synchronization time T1 and in the horizontal scanning time T2 is lessen. The pedestal level adjustment value determined is stored in the memory 131b of the video amplification-chroma circuit. The video amplification-chroma circuit 130 adjusts the pedestal level of each of the R-Y signal and the B-Y signal in the horizontal synchronization time T1 by the amount of adjustment according to the corresponding pedestal level adjustment value stored in the memory 131b. This eliminates the necessity of the complicated adjustment procedures of the pedestal level of the video signal.

The foregoing invention has been described in terms of preferred embodiments. However, those skilled in the art will recognize that many variations of such embodiments exist. Such variations are intended to be within the scope of the present invention and the appended claims.

What is claimed is:

1. A television comprising:
a video amplification-chroma circuit for generating a sawtooth-like drive signal and three primary color signals from a component video signal inputted thereto, the component video signal including a luminance signal with vertical and horizontal synchronizing signals superimposed thereon, a red color-difference signal (V), and a blue color-difference signal (U);

a microcomputer for controlling processing to be performed by the video amplification-chroma circuit;
a video output circuit for amplifying the three primary color signals;
a picture tube for emitting an electron beam therein using high voltage inputted thereto, and for receiving the amplified primary color signals inputted thereto and displaying an image corresponding to the component video signal;
a deflection circuit for generating a high-frequency signal and a drive current from the drive signal inputted thereto;
a high voltage circuit having a flyback transformer for supplying the picture tube with the high voltage generated from the high-frequency signal inputted thereto;
a deflection coil for receiving input of the drive current and driving the electron beam emitted within the picture tube;
an amplification circuit for amplifying the respective red and blue color-difference signals with reference to a ground potential to generate respective amplified signals for V and U; and
a smoothing circuit for smoothing the respective amplified signals for V and U generated,
the video amplification-chroma circuit comprising:
a separating circuit for separating the vertical and horizontal synchronizing signals from the component video signal;
a semiconductor memory for storing therein a pedestal level adjustment value for V for adjustment of a pedestal level of the red color-difference signal, the pedestal level adjustment value for V having any one of a plurality of stepwise values, and a pedestal level adjustment value for U for adjustment of a pedestal level of the blue color-difference signal, the pedestal level adjustment value for U having any one of a plurality of stepwise values; and
a pedestal level adjustment circuit for adjusting the pedestal level of the red color-difference signal by an amount of adjustment according to the pedestal level adjustment value for V stored in the semiconductor memory, and for adjusting the pedestal level of the blue color-difference signal by an amount of adjustment according to the pedestal level adjustment value for U stored in the semiconductor memory in a horizontal synchronization time of the horizontal synchronizing signal separated by the separating circuit,
the television being operable to display the image from the picture tube based on the component video signal obtained after the adjustment,
wherein the microcomputer includes an analog/digital conversion circuit for generating an amplified signal value for V and an amplified signal value for U in digital form corresponding to and from the amplified signals for V and U smoothed by the smoothing circuit, respectively,
wherein the microcomputer is adapted to generate the amplified signal values for V and U in a state where the red and blue color-difference signals are not being inputted into the video amplification-chroma circuit, to select and determine the pedestal level adjustment value for V from the plurality of stepwise values, based on said amplified signal value for V generated in the state, in such a manner that the amplified signal value for V generated by the analog/digital conversion circuit takes a value that is most close to zero, as well as the pedestal level adjustment value for U from the plurality of stepwise values, based on said amplified signal value for U generated in the state, in such a manner that the U amplified signal value generated by the analog/digital conversion circuit takes a value that is most close to zero, and to output the pedestal level adjustment value for V and the pedestal level adjustment value for U determined to the video amplification-chroma circuit,
wherein the video amplification-chroma circuit is adapted to store in the semiconductor memory the pedestal level adjustment value for V and the pedestal level adjustment value for U inputted from the microcomputer, thereby decreasing deviation in the pedestal level of each of the red and blue color-difference signals in the horizontal synchronization time which deviation may be caused by electric noise jumped into the red and blue color-difference signals from the flyback transformer during the horizontal synchronization time.

2. A television comprising:
a video input section for inputting a video signal with a synchronizing signal superimposed thereon, the video signal including a luminance signal and color-difference signals;
a seperating circuit for separating the synchronizing signal from the video signal inputted;
a memory for storing therein a pedestal level adjustment value for adjustment of a pedestal level of the color-difference signal;
an adjustment section for adjusting the pedestal level of the color-difference signal in a horizontal synchronization time of a synchronizing signal separated by the separating circuit, by an amount of adjustment according to the pedestal level adjustment value stored in the memory;
a video display unit for displaying an image based on the video signal obtained after the adjustment;
a detecting section for detecting the pedestal level of the color-difference signal in the horizontal synchronization time;
an adjustment value determination section for determining the pedestal level adjustment value based on the pedestal level detected so as to lessen a difference between the pedestal level of the color-difference signal in the horizontal synchronization time and a pedestal level of the color-difference signal in a horizontal scanning time of the synchronizing signal;
an adjustment value storage section for storing the pedestal level adjustment value determined in the memory;
the detecting section includes an amplification circuit for amplifying the color-difference signal to generate an amplified signal with reference to a ground potential, a smoothing circuit for smoothing the amplified signal generated, and an analog/digital conversion cicuit for generating a digital amplified signal value corresponding to and from the amplified signal smoothed, and the detecting section is configured to generate the amplified signal value in a state where the color-difference signal is not being inputted into the video input section so as to detect the pedestal level of the color-difference signal in the horizontal synchronization time; and
the adjustment value determination section determines the pedestal level adjustment value based on the amplified signal value generated by the analog/digital conversion circuit in the state where the color-difference signal is not being inputted so as to lessen a difference in pedestal level of the color-difference signal between in the horizontal synchronization time and in the horizontal scanning time.

3. The television according to claim 2, wherein the pedestal level adjustment value is a gradient value which has any one of a plurality of stepwise values, and wherein the adjustment value determination section selects and determines the pedestal level adjustment value from the plurality of stepwise values, based on the amplified signal value generated by the analog/digital conversion circuit in the state where the color-difference signal is not being inputted, in such a manner that the amplified signal value generated by the analog/digital conversion circuit takes a value that is most close to zero.

4. The television according to claim 2, wherein the synchronizing signal comprises a vertical synchronizing signal and a horizontal synchronizing signal, wherein the video signal is a component video signal including the luminance signal with the synchronizing signal superimposed thereon, a red color-difference signal (V), and a blue color-difference signal (U);

wherein the pedestal level adjustment value is the gradient value that has any one of the plurality of stepwise values, and includes a pedestal level adjustment value for V for adjustment of the pedestal level of the red color-difference signal, and a pedestal level adjustment value for U for adjustment of the pedestal level of the blue color-difference signal, and wherein the separating circuit separates the vertical synchronizing signal and the horizontal synchronizing signal from the video signal, the adjustment section adjusts the pedestal level of the red color-difference signal by an amount of adjustment according to the pedestal level adjustment value for V stored in the semiconductor memory, as well as the pedestal level of the blue color-difference signal by an amount of adjustment according to the pedestal level adjustment value for U stored in the semiconductor memory in the horizontal synchronization time of the horizontal synchronizing signal separated by the separating circuit, the detecting section detects the pedestal level of each of the red and blue color-difference signals in the horizontal synchronization time, and the adjustment value determination section determines the pedestal level adjustment value for V so as to minimize the difference in the pedestal level of the red color-difference signal between in the horizontal synchronization time and in the horizontal scanning time, as well as the pedestal level adjustment value for U so as to minimize the difference in the pedestal level of the blue color-difference signal between in the horizontal synchronization time and in the horizontal scanning time, based on each pedestal level detected by the detecting section.

5. A television comprising:

a video input section for inputting a video signal with a synchronizing signal superimposed thereon, the video signal including a luminance signal and color-difference signals;

a separating circuit for separating the synchronizing signal from the video signal inputted;

a memory for storing therein a pedestal level adjustment value for adjustment of a pedestal level of the color-difference signal;

an adjustment section for adjusting the pedestal level of the color-difference signal in a horizontal synchronization time of the synchronizing signal separated by the separating circuit, by an amount of adjustment according to the pedestal level adjustment value stored in the memory;

a video display unit for displaying an image based on the video signal obtained after the adjustment;

a detecting section for detecting the pedestal level of the color-difference signal in the horizontal synchronization time;

an adjustment value determination section for determining the pedestal level adjustment value based on the pedestal level detected so as to lessen a difference between the pedestal level of the color-difference signal in the horizontal synchronization time and a pedestal level of the color-difference signal in a horizontal scanning time of the synchronizing signal;

an adjustment value storage section for storing the pedestal level adjustment value determined in the memory;

the detecting section includes the amplification circuit for amplifying the color-difference signal to generate the amplified signal with reference to the ground potential, the analog/digital conversion cicuit for generating the digital amplified signal value corresponding to and from the amplified signal generated, and a difference calculator for determining a difference between the amplified signal value in the horizontal synchronization time and the amplified signal value in the horizontal scanning time, and the detecting section is configured to detect the pedestal level of the color-difference signal in the horizontal synchronization time by determining the difference between the amplified signal values in the state where the color-difference signal is not being inputted in the video input section, and the adjustment value determination section determines the pedestal level adjustment value based on the difference between the amplified signal values determined by the difference calculator in the state where the color-difference signal is not being inputted so as to lessen said difference in pedestal level of the color-difference signal between in the horizontal synchronization time and in the horizontal scanning time.

6. The television according to claim 5, wherein the pedestal level adjustment value is the gradient value that has any one of the plurality of stepwise values, and wherein the adjustment value determination section selects and determines the pedestal level adjustment value from the plurality of stepwise values, based on the difference in the amplified signal value generated by the analog/digital conversion circuit in the state where the color-difference signal is not being inputted, in such a manner that the difference in the amplified signal value generated by the analog/digital conversion circuit is most close to zero.

* * * * *